(12) United States Patent
Li et al.

(10) Patent No.: US 12,519,577 B2
(45) Date of Patent: Jan. 6, 2026

(54) METHODS AND DEVICES FOR GENERATING HARQ-ACK FEEDBACK OF MULTIPLE PDSCHS SCHEDULED BY SINGLE DCI

(71) Applicant: ZTE Corporation, Shenzhen (CN)

(72) Inventors: Xincai Li, Shenzhen (CN); Li Tian, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 377 days.

(21) Appl. No.: 17/895,203

(22) Filed: Aug. 25, 2022

(65) Prior Publication Data
US 2022/0416956 A1 Dec. 29, 2022

Related U.S. Application Data

(63) Continuation of application No. PCT/CN2020/121444, filed on Oct. 16, 2020.

(51) Int. Cl.
*H04L 1/1829* (2023.01)
*H04W 72/23* (2023.01)

(52) U.S. Cl.
CPC .......... *H04L 1/1864* (2013.01); *H04W 72/23* (2023.01)

(58) Field of Classification Search
CPC ... H04L 1/1864; H04L 1/1854; H04L 1/1861; H04W 72/23
USPC ........................................................ 370/329
See application file for complete search history.

(56) References Cited

U.S. PATENT DOCUMENTS

| | | | | |
|---|---|---|---|---|
| 11,496,252 | B2 * | 11/2022 | Li | ............... H04L 1/1822 |
| 2020/0092068 | A1 * | 3/2020 | Yang | ............ H04W 52/06 |
| 2020/0106569 | A1 * | 4/2020 | Tsai | ............. H04W 72/23 |
| 2021/0105102 | A1 * | 4/2021 | Li | ............... H04L 1/1896 |
| 2021/0352731 | A1 * | 11/2021 | Yang | ............ H04L 5/0055 |

(Continued)

FOREIGN PATENT DOCUMENTS

WO  WO 2020146462 A1  7/2020

OTHER PUBLICATIONS

International Search Report and Written Opinion regarding PCT/CN2020/121444 dated Jul. 15, 2021.

(Continued)

*Primary Examiner* — Thuong Nguyen
(74) *Attorney, Agent, or Firm* — Crowell & Moring LLP

(57) ABSTRACT

The present disclosure describes methods, system, and devices for generating a hybrid automatic repeat request acknowledgement (HARQ-ACK) codebook feedback for at least one physical downlink shared channel (PDSCH) scheduled by a downlink control information (DCI). One method includes receiving, by a user equipment (UE), a radio resource control (RRC) parameter to configure an enhanced dynamic HARQ-ACK codebook feedback mode; receiving, by the UE, the DCI comprising a set of parameters to configure at least one PDSCH group comprising the at least one PDSCH; and transmitting, by the UE, a HARQ-ACK codebook feedback based on the set of parameters in the DCI and the at least one PDSCH group. Another method includes receiving, by the UE, the DCI comprising a bit field used for triggering a one-shot HARQ-ACK feedback mode; and transmitting, by the UE, a one-shot HARQ-ACK feedback based on a set of parameters in the DCI.

15 Claims, 15 Drawing Sheets

(56) References Cited

U.S. PATENT DOCUMENTS

| | | | | |
|---|---|---|---|---|
| 2022/0007399 | A1* | 1/2022 | Rastegardoost | H04L 5/0073 |
| 2022/0045801 | A1* | 2/2022 | Wang | H04W 72/56 |
| 2022/0052793 | A1* | 2/2022 | Bao | H04L 1/1822 |
| 2022/0174693 | A1* | 6/2022 | Takeda | H04W 72/20 |
| 2022/0201728 | A1* | 6/2022 | Lin | H04W 72/0446 |
| 2022/0232602 | A1* | 7/2022 | Liang | H04L 5/0053 |
| 2022/0239445 | A1* | 7/2022 | Yoshioka | H04W 72/23 |
| 2022/0361211 | A1* | 11/2022 | Karaki | H04L 1/1887 |
| 2022/0369350 | A1* | 11/2022 | Yoshimura | H04L 1/1614 |
| 2022/0416956 | A1* | 12/2022 | Li | H04W 72/23 |
| 2023/0023656 | A1* | 1/2023 | Rastegardoost | H04W 72/0446 |
| 2023/0247649 | A1* | 8/2023 | Takahashi | H04W 72/232 370/329 |
| 2023/0328727 | A1* | 10/2023 | Salah | H04L 5/0055 370/329 |

OTHER PUBLICATIONS

ZTE et al. "Discussion on scheduling and HARQ for NR-U" 1, 7-39 3GPP TSG RAN WGJ Meeting #98bis, RI-1909976, Oct. 18, 2019.

LG Electronics. "HARQ procedure for NR-U" 2-6 3GPP TSG RAN WGJ #98bis, RI-1910821, Oct. 20, 2019.

QUALCOMM Incorporated. "Enhancements to Scheduling and HARQ operation for 1-39 NR-U" 3GPP TSG RAN WGJ Meeting #97, RI-1907263, May 17, 2019.

Extended European Search Report regarding EP 20 95 7203 dated Mar. 29, 2023, 10 pages.

ZTE et al., "Remaining issues on scheduling and HARQ for NR-U," 3GPP TSG RAN WG1 Meeting #99, R1-1911824, Reno, USA, Nov. 18-22, 2019.

Japanese Office Action with English translation regarding 2022-546017 dated Jun. 21, 2023, 8 pages.

3GPP TS 38.212 V16.3.0, "3rd Generation Partnership Project; Technical Specification Group Radio Access Network; NR; Physical layer procedures for control (Release 16)", Oct. 2, 2020, pp. 64-73.

MediaTek Inc., "Enhancements to HARQ for NR-U operation," 3GPP TSG RAN WG1 #97 R1-1906545, Internet <URL:https://www.3gpp.org/ftp/tsg_ran/WG1_RL1/TSGR1_97/Docs/R1-1906545.zip>, May 4, 2019.

3GPP TS 38.212 V16.3.0, "3rd Generation Partnership Project; Technical Specification Group Radio Access Network; NR; Multiplexing and channel coding (Release 16)," Oct. 1, 2020, pp. 121-125.

Japanese Office Action with English translation regarding 2022-546017 dated Oct. 24, 2023, 5 pages.

Japanese Notice of Allowance with English translation regarding 2022-546017 dated May 20, 2024, 8 pages.

* cited by examiner

400 receiving, by a user equipment (UE), a radio resource control (RRC) parameter to configure an enhanced dynamic HARQ-ACK codebook feedback mode
410 receiving, by the UE, the DCI comprising a set of parameters to configure at least one PDSCH group comprising the at least one PDSCH
420 transmitting, by the UE, a HARQ-ACK codebook feedback based on the set of parameters in the DCI and the at least one PDSCH group
430

FIG. 4

1000 ⟶ receiving, by the UE, the DCI comprising a bit field used for triggering a one-shot HARQ-ACK feedback mode;
1010 transmitting, by the UE, a one-shot HARQ-ACK feedback based on the set of parameters in the DCI
1020

METHODS AND DEVICES FOR GENERATING HARQ-ACK FEEDBACK OF MULTIPLE PDSCHS SCHEDULED BY SINGLE DCI

CROSS-REFERENCE TO RELATED APPLICATION

This application is a continuation application of PCT International Patent Application No. PCT/CN2020/121444, filed with the China National Intellectual Property Administration, PRC on Oct. 16, 2020, which is herein incorporated by reference in its entirety.

TECHNICAL FIELD

The present disclosure is directed generally to wireless communications. Particularly, the present disclosure relates to methods and devices for generating hybrid automatic repeat request acknowledgement (HARQ-ACK) feedback of multiple physical downlink shared channels (PDSCHs) scheduled by a single downlink control information (DCI).

BACKGROUND

Wireless communication technologies are moving the world toward an increasingly connected and networked society. For new radio (NR) operation on high frequency carriers, for example above 52.6 GHz, larger sub-carrier spacing (SCS), for example, 240 kHz, 480 kHz, and 960 kHz, may be used. The slot duration may be very short, such as 15.625 micro-second with 960 kHz SCS configured. In the present disclosure, various embodiments are described for supporting multi-PDSCH scheduled by one DCI for the benefits of improving coverage and data processing.

When the wireless communications is performed on unlicensed carriers, one or more of the transmitted wireless messages may be lost or corrupted, or are uncorrected due to channel quality imperfection and fluctuation in the communication resources. Channel access may be performed before data transmission. When channel access failure occurs, a nodeB (NB, e.g., a gNB) and/or user equipment (UE) may not send data correctly, and/or the corresponding receiver cannot receive the data correctly. Thus, these messages may need to be retransmitted, worsening the latency and reliability. Improved proper designs of control mechanisms for detection and retransmission of the lost or corrupted messages may help to improve the efficiency of the wireless access network, particular for accessing unlicensed shared radio frequency bands. The present disclosure may address at least some of issues associated with the existing system to improve the performance of the wireless communication.

SUMMARY

This document relates to methods, systems, and devices for wireless communication, and more specifically, for generating hybrid automatic repeat request acknowledgement (HARQ-ACK) feedback of multiple physical downlink shared channels (PDSCHs) scheduled by a single downlink control information (DCI).

In one embodiment, the present disclosure describes a method for wireless communication. The method includes generating a hybrid automatic repeat request acknowledgement (HARQ-ACK) codebook feedback for at least one physical downlink shared channel (PDSCH) scheduled by a downlink control information (DCI) by: receiving, by a user equipment (UE), a radio resource control (RRC) parameter to configure an enhanced dynamic HARQ-ACK codebook feedback mode; receiving, by the UE, the DCI comprising a set of parameters to configure at least one PDSCH group comprising the at least one PDSCH; and transmitting, by the UE, a HARQ-ACK codebook feedback based on the set of parameters in the DCI and the at least one PDSCH group.

In another embodiment, the present disclosure describes a method for wireless communication. The method includes generating a hybrid automatic repeat request acknowledgement (HARQ-ACK) codebook feedback for at least one physical downlink shared channel (PDSCH) scheduled by a downlink control information (DCI) by: receiving, by the UE, the DCI comprising a bit field used for triggering a one-shot HARQ-ACK feedback mode; and transmitting, by the UE, a one-shot HARQ-ACK feedback based on a set of parameters in the DCI.

In some other embodiments, an apparatus for wireless communication may include a memory storing instructions and a processing circuitry in communication with the memory. When the processing circuitry executes the instructions, the processing circuitry is configured to carry out the above methods.

In some other embodiments, a device for wireless communication may include a memory storing instructions and a processing circuitry in communication with the memory. When the processing circuitry executes the instructions, the processing circuitry is configured to carry out the above methods.

In some other embodiments, a computer-readable medium comprising instructions which, when executed by a computer, cause the computer to carry out the above methods.

The above and other aspects and their implementations are described in greater detail in the drawings, the descriptions, and the claims.

BRIEF DESCRIPTION OF THE DRAWINGS

FIG. 4 shows a flow diagram of a method for wireless communication.

DETAILED DESCRIPTION

Figure 1:
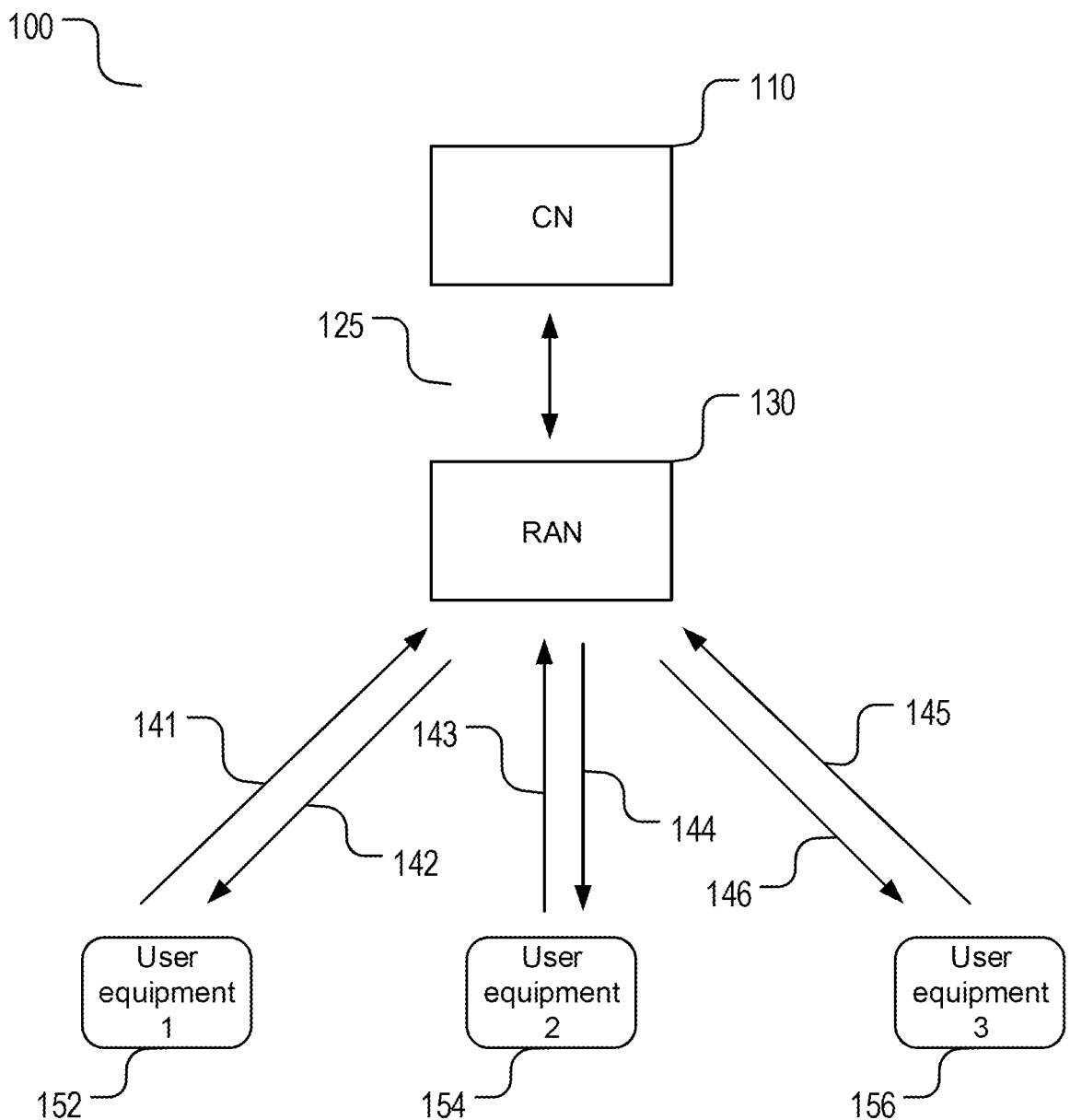
FIG. 1 shows an example of a wireless communication system.

The present disclosure will now be described in detail hereinafter with reference to the accompanied drawings, which form a part of the present disclosure, and which show, by way of illustration, specific examples of embodiments. Please note that the present disclosure may, however, be embodied in a variety of different forms and, therefore, the covered or claimed subject matter is intended to be construed as not being limited to any of the embodiments to be set forth below.

Throughout the specification and claims, terms may have nuanced meanings suggested or implied in context beyond an explicitly stated meaning. Likewise, the phrase "in one embodiment" or "in some embodiments" as used herein does not necessarily refer to the same embodiment and the phrase "in another embodiment" or "in other embodiments" as used herein does not necessarily refer to a different embodiment. The phrase "in one implementation" or "in some implementations" as used herein does not necessarily refer to the same implementation and the phrase "in another implementation" or "in other implementations" as used herein does not necessarily refer to a different implementation. It is intended, for example, that claimed subject matter includes combinations of exemplary embodiments or implementations in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B, or C, is intended to mean A, B, and C, here used in the inclusive sense, as well as A, B or C, here used in the exclusive sense. In addition, the term "one or more" or "at least one" as used herein, depending at least in part upon context, may be used to describe any feature, structure, or characteristic in a singular sense or may be used to describe combinations of features, structures or characteristics in a plural sense. Similarly, terms, such as "a", "an", or "the", again, may be understood to convey a singular usage or to convey a plural usage, depending at least in part upon context. In addition, the term "based on" or "determined by" may be understood as not necessarily intended to convey an exclusive set of factors and may, instead, allow for existence of additional factors not necessarily expressly described, again, depending at least in part on context.

The present disclosure describes methods and devices for generating hybrid automatic repeat request acknowledgement (HARQ-ACK) feedback of multiple physical downlink shared channels (PDSCHs) scheduled by a single downlink control information (DCI).

Next generation (NG), or 5th generation (5G), wireless communication may provide a range of capabilities from downloading with fast speeds to support real-time low-latency communication. New generation (NG) mobile communication system are moving the world toward an increasingly connected and networked society. High-speed and low-latency wireless communications rely on efficient network resource management and allocation between user equipment and wireless access network nodes (including but not limited to wireless base stations).

Using unlicensed carriers to transmit data may increase the utilization rate of available transmission resources. Considering the regulatory requirements for unlicensed operation, a device may need to perform a clear channel assessment (CCA) and have a successful result prior to data transmission. To improve efficiency of data transmission, channel access procedure and control signaling may need to be considered.

Enhanced dynamic HARQ-ACK codebook and one-shot HARQ-ACK feedback schemes may provide multiple transmission opportunity for ACK/NACK feedback. In the enhanced dynamic HARQ-ACK codebook scheme, three new bit fields may be introduced in a DCI format 1_1, which include one bit field for PDSCH group index, one bit field for a new feedback indication (NFI), and one bit field for a number of request PDSCH group. The HARQ-ACK codebook for two PDSCH groups can be transmitted on the same physical uplink control channel/physical uplink shared channel (PUCCH/PUSCH) if two PDSCH groups are requested at the same time. In NR-U, only two PDSCH groups may be supported. The HARQ-ACK feedback for the scheduled PDSCH may be triggered all the time by the DCI.

For new radio (NR) operation on the high frequency, for example but not limited to, above 52.6 GHz, larger subcarrier spacing (SCS), for example, 240 kHz, 480 kHz, or 960 kHz, may need to be used. The slot duration is very short, for example, may be as short as 15.625 us with 960 kHz SCS configured. Here, "us" is referred as micro-second. It is important to use DCI to schedule one or more PDSCH to achieve high efficiency and flexibility.

The present disclosure describes various embodiments for supporting multi-PDSCH scheduled by one DCI, which benefits coverage and data processing of the wireless communication system. The present disclosure describes how it is specified for a nodeB (NB, e.g., a gNB) to trigger or indicate UE to feedback the HARQ-ACK information for these scheduled PDSCH(s).

When the wireless communications is performed on unlicensed carriers, one or more of the transmitted wireless messages may be lost or corrupted, or are uncorrected due to channel quality imperfection and fluctuation in the communication resources. Channel access may be performed before data transmission. When channel access failure occurs, a gNB and/or user equipment (UE) may not send data correctly, and/or the corresponding receiver cannot receive the data correctly. Thus, these messages may need to be retransmitted, worsening the latency and reliability. Improved proper designs of control mechanisms for detection and retransmission of the lost or corrupted messages may help to improve the efficiency of the wireless access network, particular for accessing unlicensed shared radio frequency bands.

The present disclosure describes embodiments for providing improved and more transmission opportunity for HARQ-ACK feedback for reliability requirement. The schemes, such as enhanced dynamic HARQ-ACK codebook and one-shot feedback, may be enhanced for high frequency. Detail design for multi-PDSCH scheduling may be considered and described.

The present disclosure describes embodiments at least addressing some issues/problems/questions in the existing systems, for example but not limited to, how to determine the PDSCH group index of each scheduled PDSCH, how to interpret the k1 value for HARQ-ACK feedback for each PDSCH group, and/or how to design the indication of a new feedback indicator/total-downlink assignment index (NFI/T-DAI).

FIG. 1 shows a wireless communication system 100 including a core network (CN) 110, a radio access network (RAN) 130, and one or more user equipment (UE) (152, 154, and 156). The RAN 130 may include a wireless network base station, or a NG radio access network (NG-RAN) base station or node, which may include a nodeB (NB, e.g., a gNB) in a mobile telecommunications context. In one implementation, the core network 110 may include a 5G core network (5GC), and the interface 125 may include a new generation (NG) interface.

Referring to FIG. 1, a first UE 152 may wirelessly receive downlink communication 142 from the RAN 130 and wirelessly send uplink communication 141 to the RAN 130. Likewise, a second UE 154 may wirelessly receive downlink communication 144 from the RAN 130 and wirelessly send uplink communication 143 to the RAN 130; and a third UE 156 may wirelessly receive downlink communication 146 from the RAN 130 and wirelessly send uplink communication 145 to the RAN 130. For example but not limited to, a downlink communication may include a physical downlink shared channel (PDSCH) or a physical downlink control channel (PDCCH), and a uplink communication may include a physical uplink shared channel (PUSCH) or a physical uplink control channel (PUCCH). The downlink communication (142, 144, and/or 146) and/or uplink communication (141, 143, and/or 145) may be transmitted on licensed frequency carriers or NR-U frequency carriers.

In wireless communications on the unlicensed carriers, a transmitted wireless message may be lost or corrupted and uncorrectable due to channel quality imperfection and fluctuation in the communication resources. As channel access should be performed before data transmission, for example, a device needs to perform a clear channel assessment (CCA) and have a successful result prior to data transmission. In some countries and regions, there are regulatory policies for the use of unlicensed spectrum. A device may perform a listening before talke (LBT) procedure (e.g., CCA) before sending data via an unlicensed carrier. For example, according to a channel access procedure, only devices with successful CCA may send data on the unlicensed carrier.

Another problem may occur when URLLC operates in unlicensed carriers. When channel access failure occurs, the gNB/UE may not send data and the receiver may not receive the data correctly. These messages, which are not received correctly, may need to be retransmitted again, thus worsening the latency and reliability. Therefore, proper designs of control mechanisms for detection and retransmission of the lost or corrupted messages may help improve the efficiency of the wireless access network, particular for accessing unlicensed shared radio frequency bands. To improve efficiency of data transmission, channel access procedure and control signaling need to be considered, and a communication system may support fast and reliability data transmission such as using unlicensed carriers for transmitting URLLC uplink HARQ-ACK feedback.

For wireless transmission in unlicensed carriers, an enhanced dynamic HARQ-ACK feedback scheme may be used to provide multiple transmission opportunity for ACK/NACK feedback. When a UE configures an enhanced dynamic feedback scheme, a downlink control information (DCI) in a certain format, for example, DCI format 1_1, may include three new bit fields. One bit field may be for a PDSCH group index, which may be 1 bit or 2 bits. One bit field may be for a new feedback indication (NFI). In one implementation, the NFI being toggled may indicate the ACK/NACK feedback information is correctly received. One bit field may be for a number of request PDSCH group. In one implementation, the HARQ-ACK codebook for two PDSCH groups may be transmitted on a same PUCCH/PUSCH if two PDSCH groups are requested at the same time. In another implementation, only two PDSCH groups may be supported in NR-U.

The present disclosure describes various embodiments for generating HARQ-ACK feedback of multiple PDSCHs scheduled by a single DCI.

Figure 2:
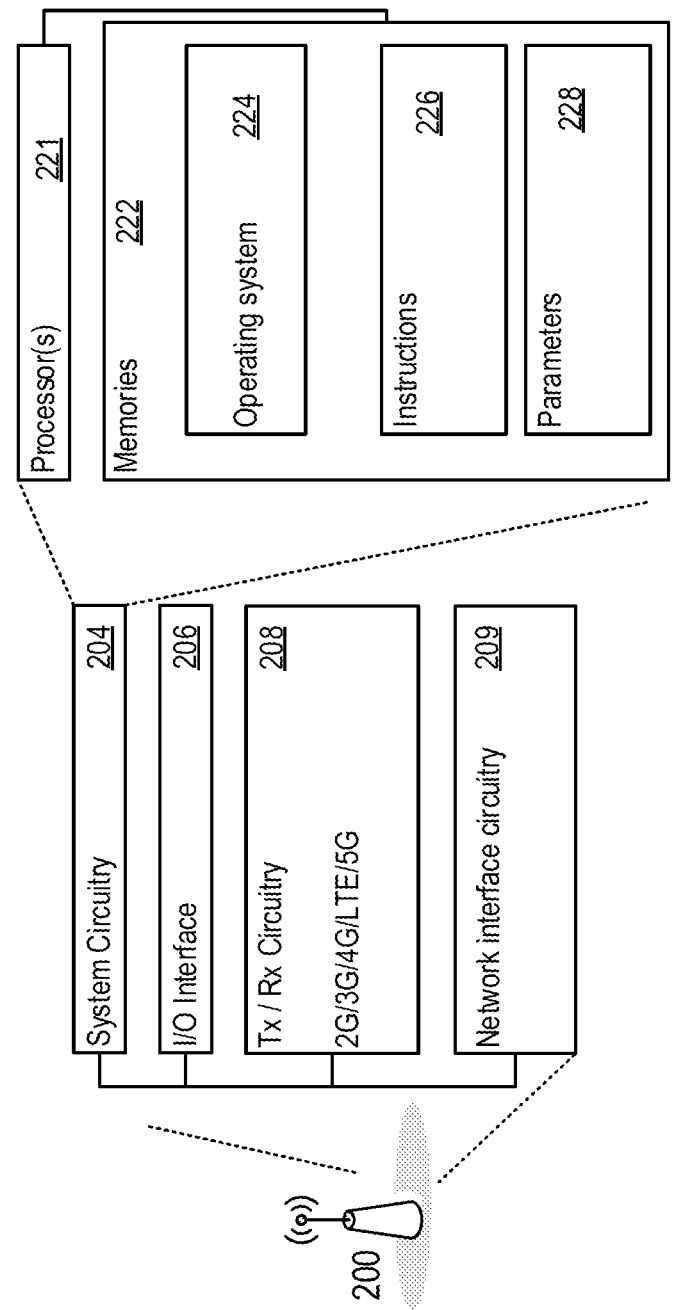
FIG. 2 shows an example of a wireless network node.

FIG. 2 shows an exemplary a radio access network or a wireless communication base station 200. The base station 200 may include radio transmitting/receiving (Tx/Rx) circuitry 208 to transmit/receive communication with one or more UEs, and/or one or more other base stations. The base station may also include network interface circuitry 209 to communicate the base station with other base stations and/or a core network, e.g., optical or wireline interconnects, Ethernet, and/or other data transmission mediums/protocols. The base station 200 may optionally include an input/output (I/O) interface 206 to communicate with an operator or the like.

The base station may also include system circuitry 204. System circuitry 204 may include processor(s) 221 and/or memory 222. Memory 222 may include an operating system 224, instructions 226, and parameters 228. Instructions 226 may be configured for the one or more of the processors 124 to perform the functions of the base station. The parameters 228 may include parameters to support execution of the instructions 226. For example, parameters may include network protocol settings, bandwidth parameters, radio frequency mapping assignments, and/or other parameters.

Figure 3:
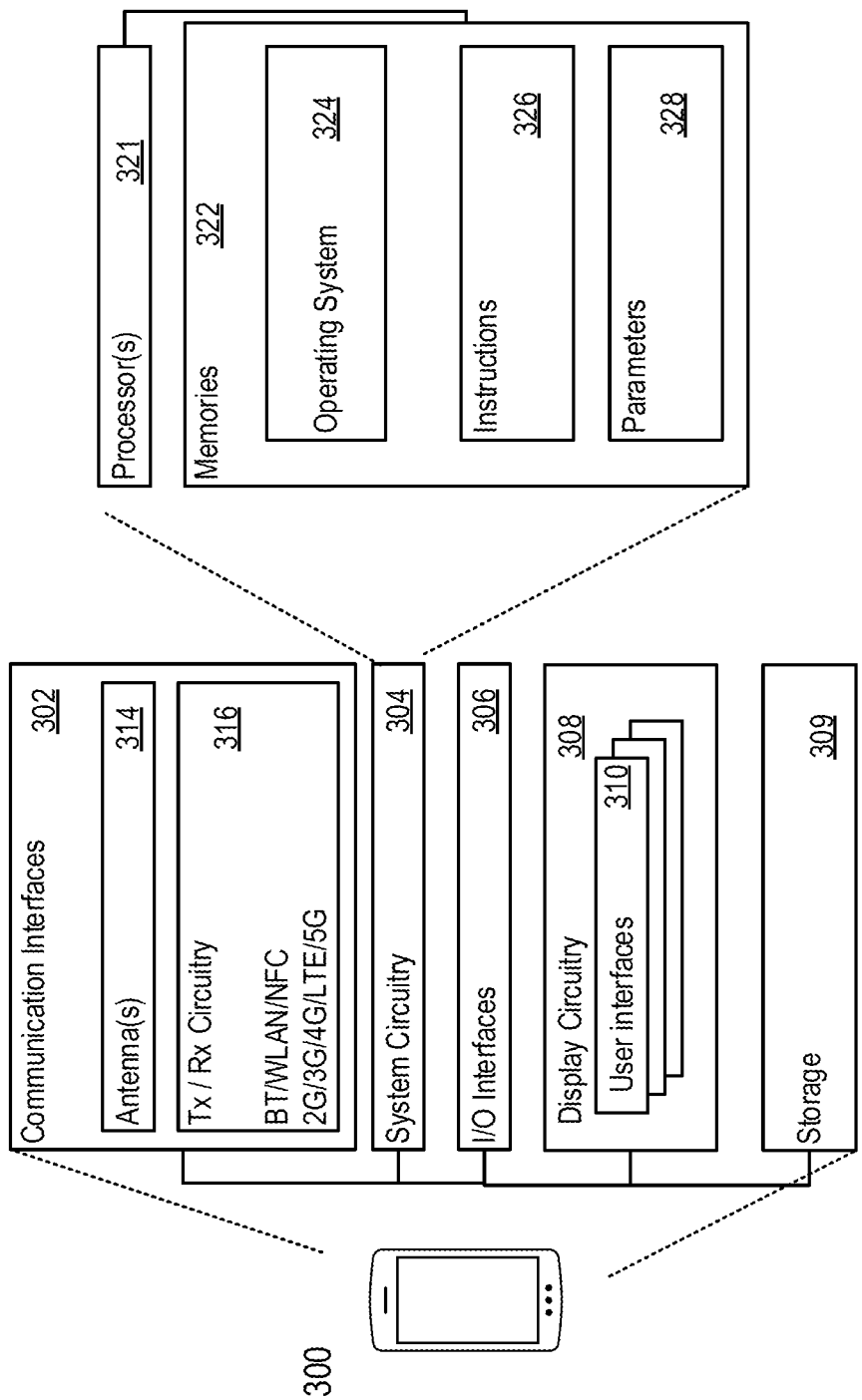
FIG. 3 shows an example of a user equipment.

FIG. 3 shows an exemplary user equipment (UE) 300. The UE 300 may be a mobile device, for example, a smart phone or a mobile communication module disposed in a vehicle. The UE 300 may include communication interfaces 302, a system circuitry 304, an input/output interfaces (I/O) 306, a display circuitry 308, and a storage 309. The display circuitry may include a user interface 310. The system circuitry 304 may include any combination of hardware, software, firmware, or other logic/circuitry. The system circuitry 304 may be implemented, for example, with one or more systems on a chip (SoC), application specific integrated circuits (ASIC), discrete analog and digital circuits, and other circuitry. The system circuitry 304 may be a part of the implementation of any desired functionality in the UE 300. In that regard, the system circuitry 304 may include logic that facilitates, as examples, decoding and playing music and video, e.g., MP3, MP4, MPEG, AVI, FLAC, AC3, or WAV decoding and playback; running applications; accepting user inputs; saving and retrieving application data; establishing, maintaining, and terminating cellular phone calls or data connections for, as one example, internet connectivity; establishing, maintaining, and terminating wireless network connections, Bluetooth connections, or other connections; and displaying relevant information on the user interface 310. The user interface 310 and the inputs/output (I/O) interfaces 306 may include a graphical user interface, touch sensitive display, haptic feedback or other haptic output, voice or facial recognition inputs, buttons, switches, speakers and other user interface elements. Additional examples of the I/O interfaces 306 may include microphones, video and still image cameras, temperature sensors, vibration sensors, rotation and orientation sensors, headset and microphone input/output jacks, Universal Serial Bus (USB) connectors, memory card slots, radiation sensors (e.g., IR sensors), and other types of inputs.

Referring to FIG. 3, the communication interfaces 302 may include a Radio Frequency (RF) transmit (Tx) and receive (Rx) circuitry 316 which handles transmission and reception of signals through one or more antennas 314. The communication interface 302 may include one or more transceivers. The transceivers may be wireless transceivers that include modulation/demodulation circuitry, digital to analog converters (DACs), shaping tables, analog to digital converters (ADCs), filters, waveform shapers, filters, pre-amplifiers, power amplifiers and/or other logic for transmitting and receiving through one or more antennas, or (for some devices) through a physical (e.g., wireline) medium. The transmitted and received signals may adhere to any of a diverse array of formats, protocols, modulations (e.g., QPSK, 16-QAM, 64-QAM, or 256-QAM), frequency channels, bit rates, and encodings. As one specific example, the communication interfaces 302 may include transceivers that support transmission and reception under the 2G, 3G, BT, WiFi, Universal Mobile Telecommunications System (UMTS), High Speed Packet Access (HSPA)+, 4G/Long Term Evolution (LTE), and 5G standards. The techniques described below, however, are applicable to other wireless communications technologies whether arising from the 3rd Generation Partnership Project (3GPP), GSM Association, 3GPP2, IEEE, or other partnerships or standards bodies.

Referring to FIG. 3, the system circuitry 304 may include one or more processors 321 and memories 322. The memory 322 stores, for example, an operating system 324, instructions 326, and parameters 328. The processor 321 is configured to execute the instructions 326 to carry out desired functionality for the UE 300. The parameters 328 may provide and specify configuration and operating options for the instructions 326. The memory 322 may also store any BT, WiFi, 3G, 4G, 5G or other data that the UE 300 will send, or has received, through the communication interfaces 302. In various implementations, a system power for the UE 300 may be supplied by a power storage device, such as a battery or a transformer.

The present disclosure describes several embodiments of methods and devices for generating hybrid automatic repeat request acknowledgement (HARQ-ACK) feedback of multiple physical downlink shared channels (PDSCHs) scheduled by a single downlink control information (DCI), which may be implemented, partly or totally, on the wireless network base station and/or the user equipment described above in FIGS. 2 and 3. In the present disclosure, the embodiments may be described with the PDSCH group number is 1, 2, and/or 3, which merely serve as examples, the various embodiments may include the PDSCH group number as any integer from 1 to 16, inclusive, for example, 4, 6, and 8.

In various embodiments, referring to FIG. 4, a method 400 for wireless communication includes generating a hybrid automatic repeat request acknowledgement (HARQ-ACK) codebook feedback for at least one physical downlink shared channel (PDSCH) scheduled by a downlink control information (DCI). The method 400 may include a portion or all of the following: step 410, receiving, by a user equipment (UE), a radio resource control (RRC) parameter to configure an enhanced dynamic HARQ-ACK codebook feedback mode; step 420, receiving, by the UE, the DCI comprising a set of parameters to configure at least one PDSCH group comprising the at least one PDSCH; and step 430, transmitting, by the UE, a HARQ-ACK codebook feedback based on the set of parameters in the DCI and the at least one PDSCH group.

One of the various embodiments describes how the UE feedbacks the HARQ-ACK information in multiple PDSCH(s) scheduling case. The UE may configure a first PDSCH group comprising the at least one PDSCH; the DCI comprises a slot offset (e.g., k1 value); and the UE transmits the HARQ-ACK feedback corresponding to the first PDSCH group in a HARQ-ACK codebook transmission slot based on the slot offset.

For the multiple PDSCH scheduled by one DCI, each PDSCH has a HARQ-ACK feedback bit separately, and in this exemplary, these HARQ-ACK bits belong to the same PDSCH group and transmit on the same PUCCH/PUSCH. For example referring to FIG. 5A, if 4 PDSCHs (532, 534, 536, and 538) are scheduled by one DCI 510 transmitting on the PDCCH 520, then 4bit HARQ-ACK may be report for each PDSCH and these 4 bits are transmitted on the same PUCCH/PUSCH 550. When a parameter for PDSCH-HARQ-ACK-Codebook in the RRC being "enhancedDynamic", enhanced dynamic HARQ-ACK codebook is configured for UE. These 5 PDSCH(s) may belong to the same PDSCH group. One bit field for PDSCH group index is included in the DCI scheduling these PDSCH(s). The HARQ-ACK feedback for these 4 PDSCHs are transmitted on the same PUCCH/PUSCH 550. One k1 value (PDSCH-to-HARQ feedback timing indicator) is included in the DCI scheduling these PDSCH(s). Optionally and/or alternatively in one implementation, the bit field for the number of requested PDSCH group(s) is one in the DCI scheduling these PDSCH(s), and the counter-downlink assignment index/total-downlink assignment index (C-DAI/T-DAI) is accumulated in the same PDSCH group and it may contain the number of PDSCH this DCI scheduled.

In one implementation, the k1 in the DCI may be the offset slot of the last scheduled PDSCH of the multiple PDSCH(s) scheduled by one DCI. The method 400 may optionally include that the UE determines the HARQ-ACK codebook transmission slot based on the slot offset after a last scheduled PDSCH in the first PDSCH group.

Figure 5A:
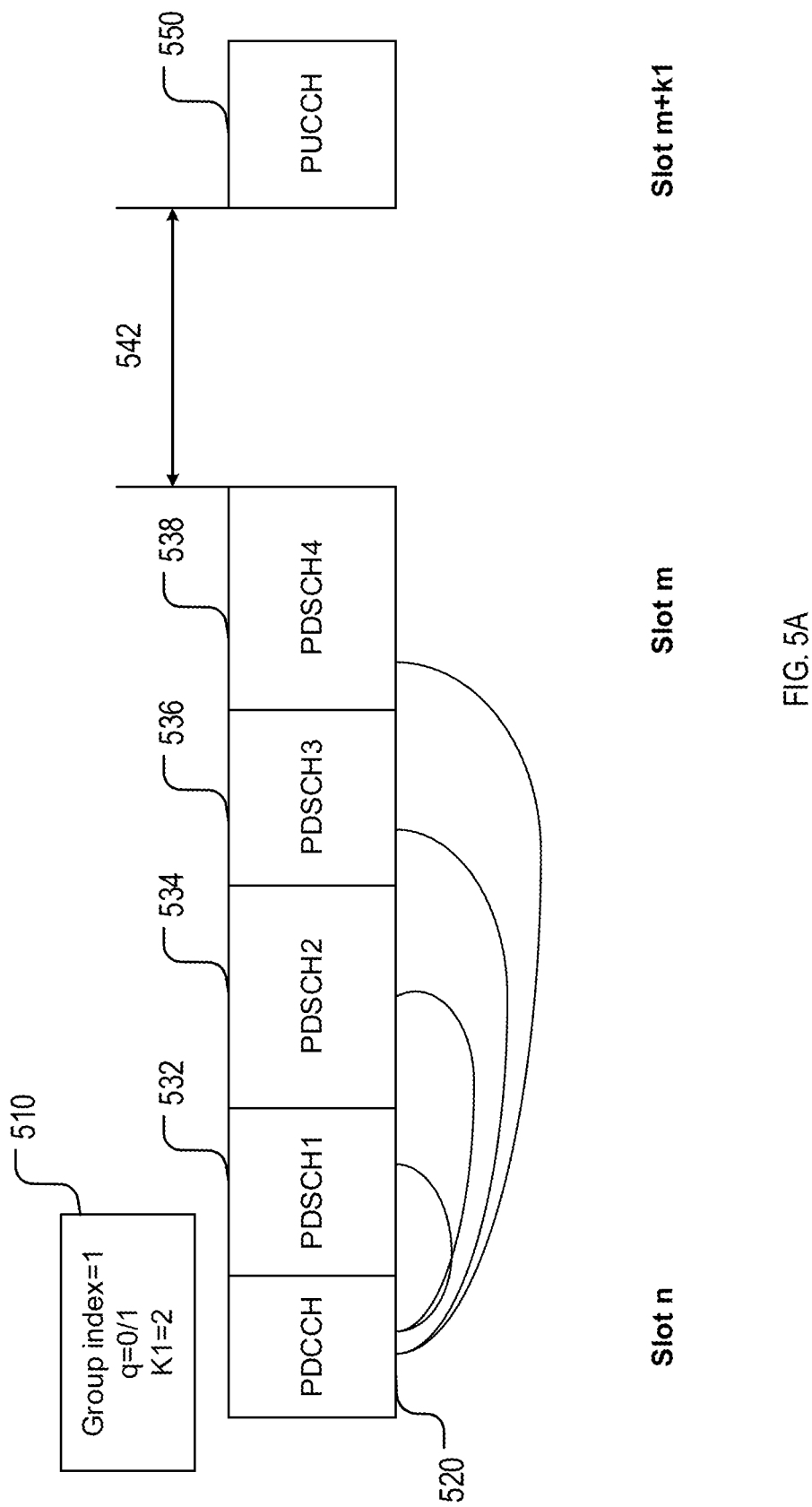
FIG. 5A shows a schematic diagram of a method for wireless communication.

For one example referring in FIG. 5A, in slot n, the UE receives one PDCCH 520 including the DCI 510 to schedule 4 PDSCHs, and these 4 PDSCH belong to the same PDSCH group 1 as indicated in the DCI scheduling these four PDSCH(s). The k1 value is 2, indicating the slot offset 542 after the last scheduled PDSCH in the first PDSCH group, so that the UE may report the HARQ-ACK codebook which contains the HARQ-ACK bits for the scheduled 4 PDSCHs at the slot m+k1, and slot m is the PDSCH4 transmitted slot that this PDCCH is scheduled.

Figure 5B:
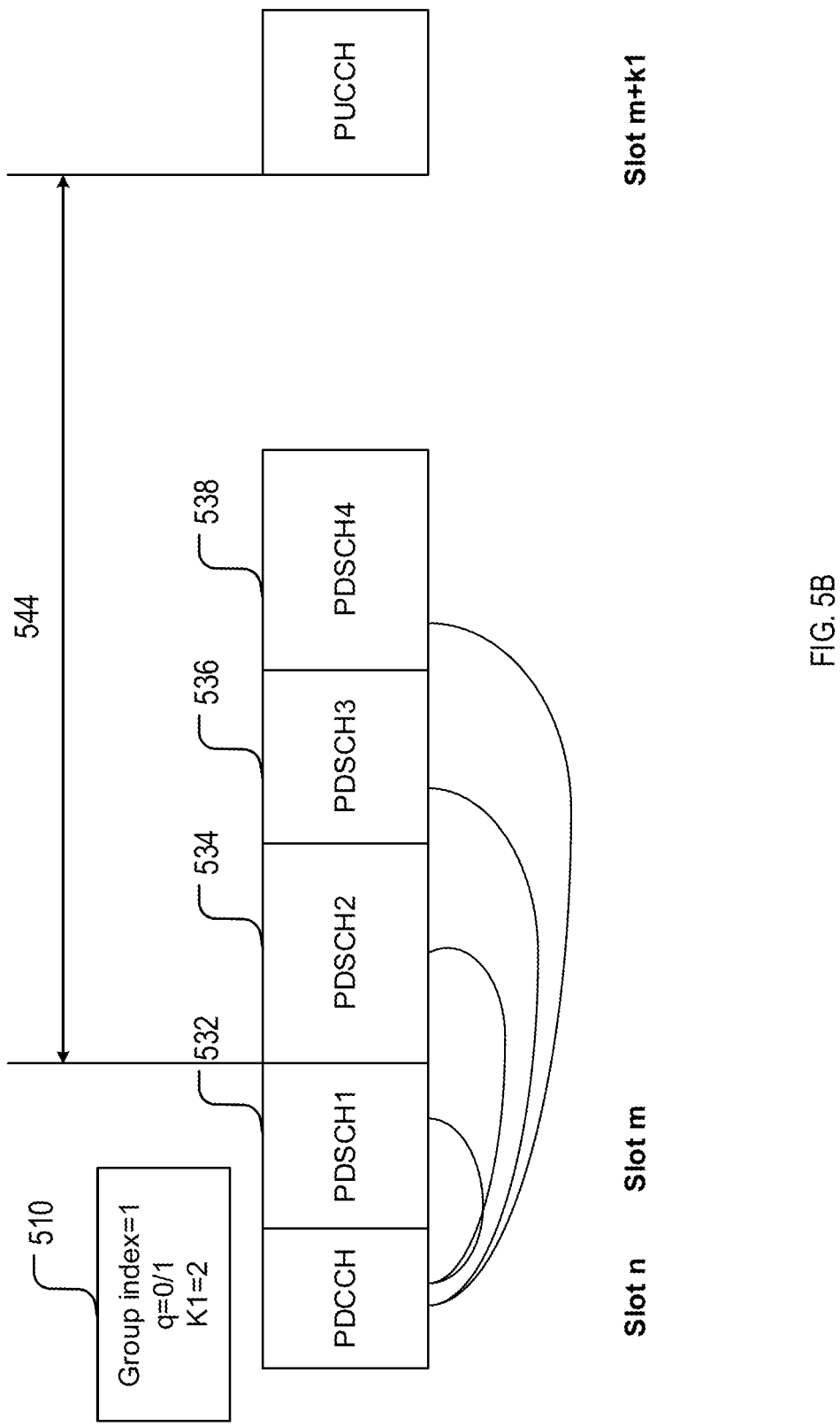
FIG. 5B shows a schematic diagram of a method for wireless communication.

In another implementation referring to FIG. 5B, the k1 in the DCI may be the offset slot of the first scheduled PDSCH of the multiple PDSCH(s) scheduling by one DCI. The method 400 may optionally include that the UE determines the HARQ-ACK codebook transmission slot based on the slot offset after a first scheduled PDSCH in the first PDSCH group. The k1 value in the DCI indicates the slot offset 544. Optionally, the slot for transmit the HARQ-ACK codebook containing all the HARQ-ACK feedback for these scheduled PDSCH(s) should be after the last PDSCH scheduled by the DCI.

Figure 5C:
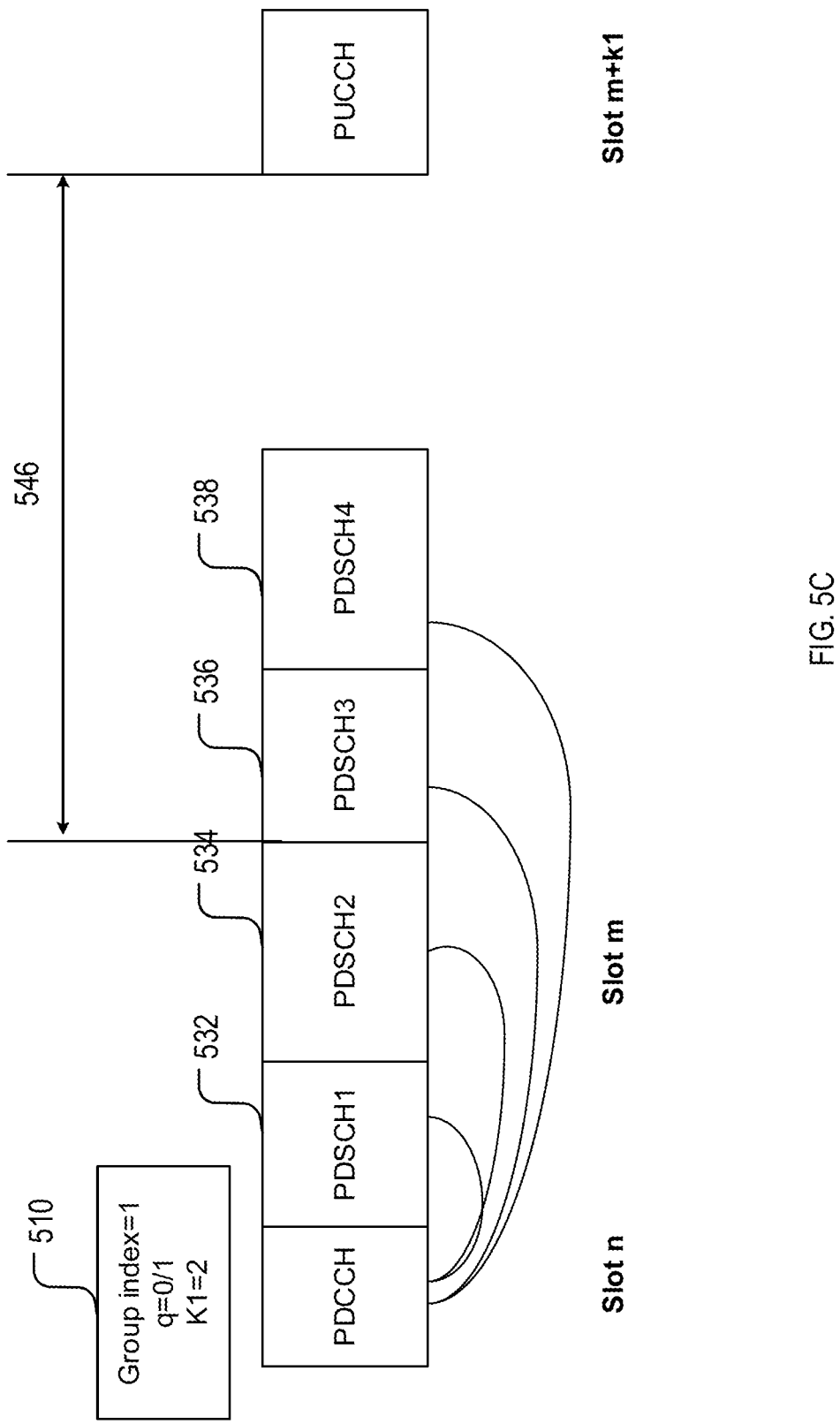
FIG. 5C shows a schematic diagram of a method for wireless communication.

In another implementation referring to FIG. 5C, the k1 in the DCI may be the offset slot of the scheduled PDSCH between the first and the last of the multiple PDSCH(s), such as the m-th slot of the scheduling these PDSCH(s), and m is <=the maximum PDSCH number this DCI scheduled. The method 400 may optionally include that the UE determines the HARQ-ACK codebook transmission slot based on the slot offset after a m-th PDSCH in the first PDSCH group, the m being an integer between 1 and a number of PDSCH in the first PDSCH group, inclusive. Optionally, m may be a pre-configured value by a RRC. For an example in FIG. 5C, when m is configured to be 2, the k1 value in the DCI indicates the slot offset 546 from the second PDSCH 534 in the PDSCH group.

Figure 5D:
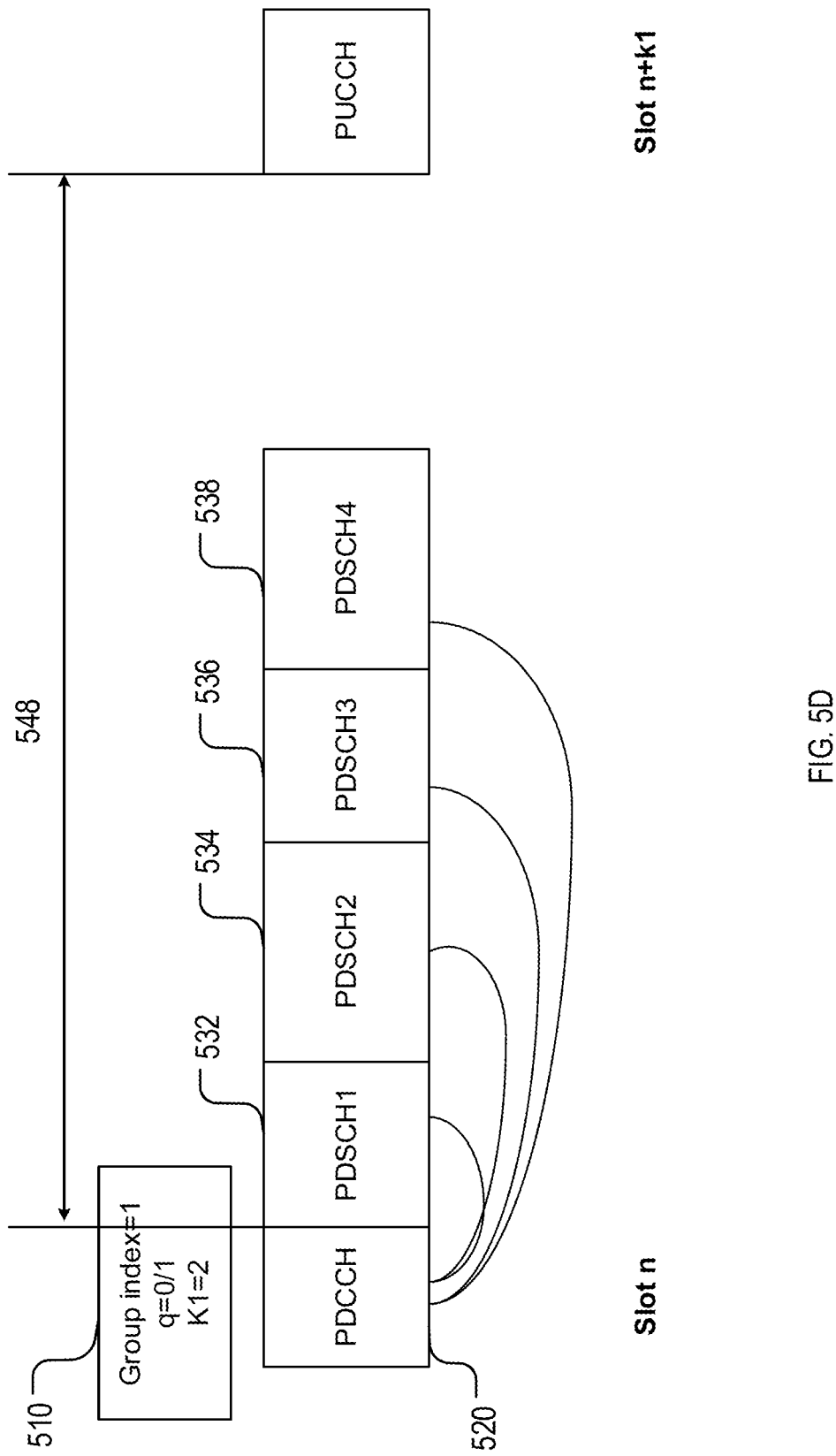
FIG. 5D shows a schematic diagram of a method for wireless communication.

In another implementation referring to FIG. 5D, the k1 in the DCI may be the offset slot of the DCI slot scheduling the multiple PDSCH. The method 400 may optionally include that the UE determines the HARQ-ACK codebook transmission slot based on the slot offset after the DCI. The k1 value in the DCI indicates the slot offset 548 from the PDCCH 520 transmitting the DCI.

In various implementations described above, when the UE has no time to process the one or more PDSCH, the UE may report NACK in the HARQ-ACK codebook for the one or more PDSCH that has not processed in time.

Another embodiment of the various embodiments describes how the UE supports enhanced dynamic HARQ-ACK codebook when multiple PDSCH are scheduled. In this embodiment, the multiple PDSCH scheduled by the same DCI may be divided into N groups, N is equal to or less than the maximum PDSCH group supported by the enhanced dynamic HARQ-ACK codebook. Optionally, these HARQ-ACK bits for these multiple scheduled PDSCH(s) may not transmit on the same PUCCH/PUSCH.

In one implementation of the embodiment, each scheduled PDSCH may have a corresponding PDSCH group index in the DCI. The DCI comprises a group index for each scheduled PDSCH in the at least one PDSCH; and the UE determines the at least one PDSCH into at least one PDSCH group based on the group index for each scheduled PDSCH. When there are n PDSCH being scheduled by the DCI, the DCI comprises n*m bit for all scheduled PDSCH, wherein n≥1, m=log2M, and M is the maximum number of the at least one PDSCH group. When the group index is a first value (e.g., "0"), the group index indicates a first PDSCH group; and when the group index is a value of "i", the group index indicates a k-th PDSCH group, wherein i equals to or smaller than a number of the at least one PDSCH, and k equals to or smaller than a maximum number of the at least one PDSCH group.

For one example, when two PDSCH group is defined, each PDSCH may need one bit to indicate which PDSCH group this PDSCH belong to, either PDSCH group 0 or PDSCH group 1. Thus, when two PDSCH group is defined, N PDSCH(s) that are scheduled by the DCI may need N bits PDSCH group index in the DCI, such as 1100 indicate UE that the first and the second scheduled PDSCH belong to PDSCH group 1, and the third and the fourth scheduled PDSCH belong to PDSCH group 0.

For another example, when four PDSCH group is defined, each PDSCH may need two bits to indicate which PDSCH group this PDSCH belong to, PDSCH group 0, PDSCH group 1, PDSCH group 3, or PDSCH group 4. Thus, when four PDSCH group is defined, N PDSCH(s) that are scheduled by the DCI may need 2*N bits PDSCH group index in the DCI, such as 11110000 indicate UE that the first and the second scheduled PDSCH belong to PDSCH group 4, and the third and the fourth scheduled PDSCH belong to PDSCH group 0.

In another implementation of the embodiment, only one PDSCH group index is in the DCI to indicate a group index for the first scheduled PDSCH in the DCI. The DCI comprises a group index for a first scheduled PDSCH in the at least one PDSCH; and the UE determines the at least one PDSCH into a corresponding PDSCH group based on the group index for the first scheduled PDSCH.

The PDSCH group index for the other scheduled PDSCH are obtained by one of the following implicit methods.

In one method, for each subsequent PDSCH relative to the first scheduled PDSCH in the at least one PDSCH, an implied group index is incremented by 1 relative to a previous PDSCH in a scheduled order. When the implied group index is incremented so as to be larger than a maximum number of PDSCH groups, the implied group index undergoes a modulo operation based on the maximum number of PDSCH groups. The UE determines the each subsequent PDSCH into a corresponding PDSCH group based on the implied group index for the each subsequent PDSCH.

For example, the PDSCH group index of the other PDSCH can be incremented by 1 for subsequent PUSCHs in the scheduled order (with modulo operation as needed). When the maximum number of PDSCH groups is 2, three PDSCH are scheduled by one DCI, and the PDSCH group index in the DCI is 1, the PDSCH group index of 1 is applies to the first scheduled PDSCH, the PDSCH group index of the second scheduled PDSCH is 0 because of ((1+1) mod 2)=0, and the PDSCH group index of the third scheduled PDSCH is 1 because of (0+1)=1.

In another method, an implied group index for a second scheduled PDSCH in the at least one PDSCH is same as the group index for the first scheduled PDSCH; and an implied group index for a third scheduled PDSCH in the at least one PDSCH is incremented by 1 relative to the group index for the first scheduled PDSCH. When the implied group index for the third scheduled PDSCH is incremented so as to be larger than a maximum number of PDSCH groups, the implied group index for the third scheduled PDSCH undergoes a modulo operation based on the maximum number of PDSCH groups. The UE configures the each subsequent PDSCH into a corresponding PDSCH group based on the implied group index for the each subsequent PDSCH.

In another method, an implied group index for a second scheduled PDSCH and a third scheduled PDSCH in the at least one PDSCH is same as the group index for the first scheduled PDSCH; an implied group index for a fourth scheduled PDSCH in the at least one PDSCH is incremented by 1 relative to the group index for the first scheduled PDSCH. When the implied group index for the fourth scheduled PDSCH is incremented so as to be larger than a maximum number of PDSCH groups, the implied group index for the fourth scheduled PDSCH undergoes a modulo operation based on the maximum number of PDSCH groups. The UE configures the each subsequent PDSCH into a corresponding PDSCH group based on the implied group index for the each subsequent PDSCH.

For one example, the PDSCH group index of the second and/or the third scheduled PDSCH is the same as the first scheduled PDSCH. The PDSCH group index of the third and/or the fourth scheduled PDSCH is incremented by 1 (with modulo operation as needed). In one implementation referring to FIG. 6, the PDSCH group index in the DCI 610 is 0 and is transmitted on PDCCH 612. The PDSCH group index of 0, indicating the group 0 (620), is used for the first scheduled PDSCH (PDSCH1), the second scheduled PDSCH (PDSCH2), and the third scheduled PDSCH (PDSCH3). The PDSCH group index of the fourth PDSCH (PDSCH4), the fifth PDSCH (PDSCH5), and the sixth scheduled PDSCH (PDSCH6) is the PDSCH group 1 (630) because of (0+1)=1.

Figure 6A:
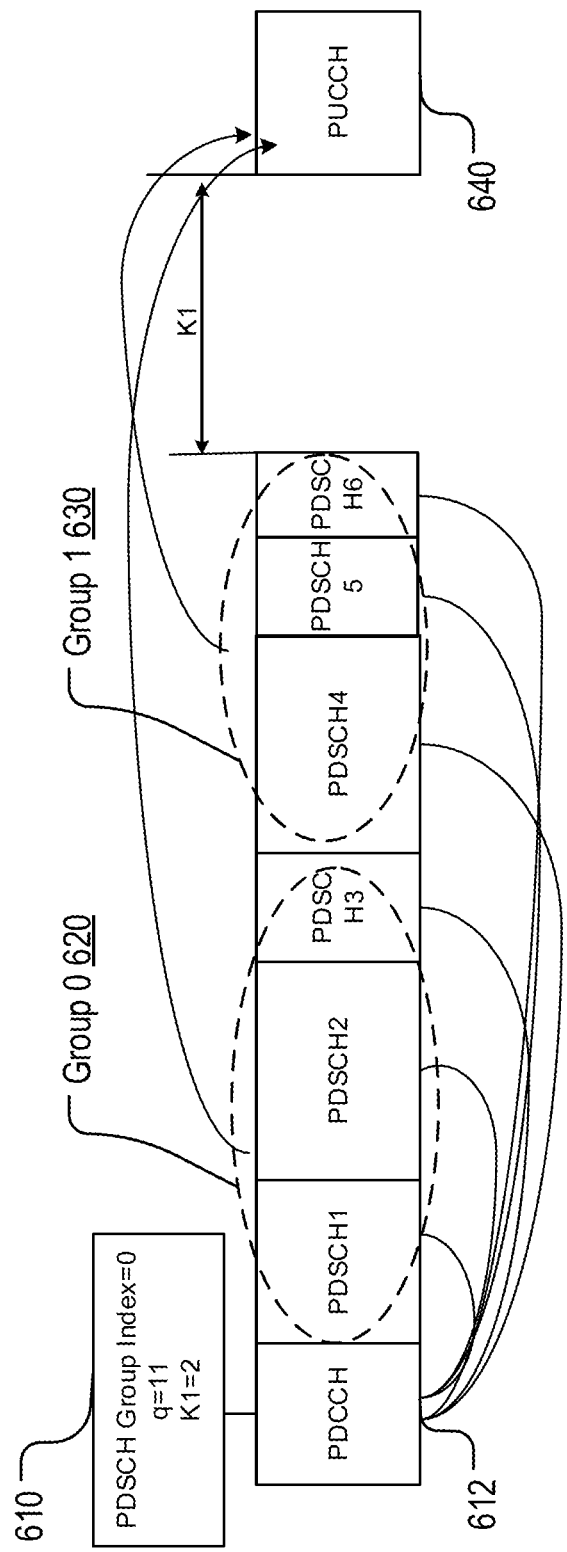
FIG. 6A shows a schematic diagram of a method for wireless communication.

Optionally as shown in FIG. 6A, these HARQ-ACK bits for these six scheduled PDSCHs may transmit on the same PUCCH/PUSCH 640 when these two PDSCH groups are triggered for HARQ-ACK feedback and only one k1 is provided.

Figure 6B:
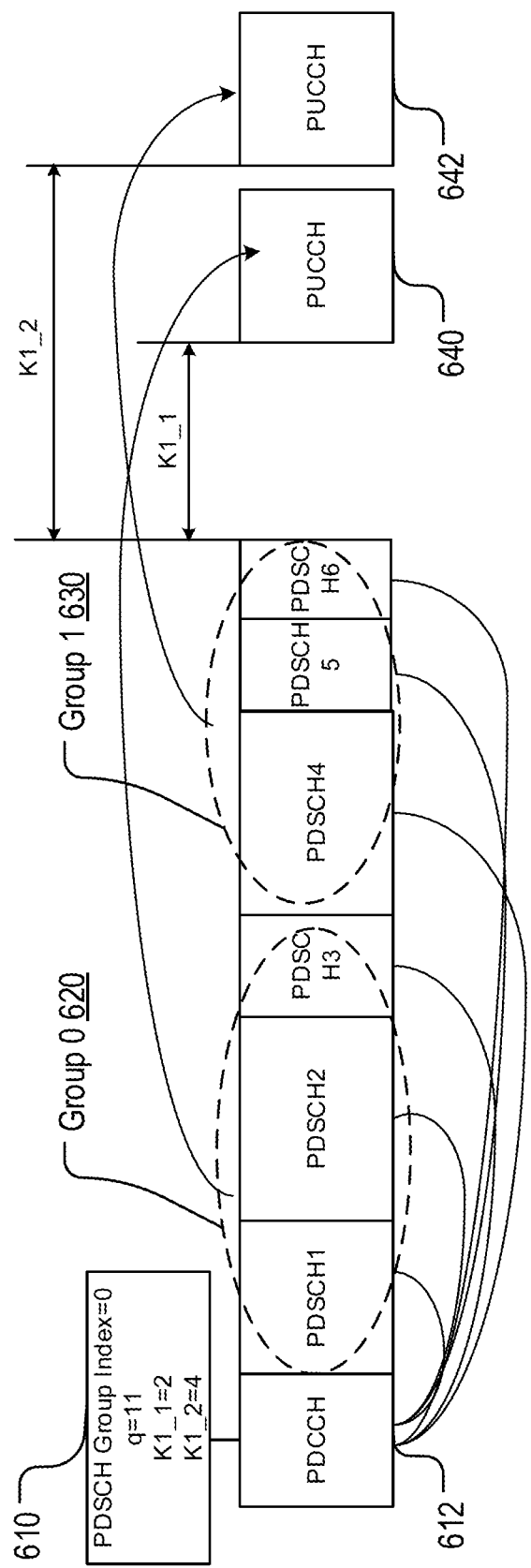
FIG. 6B shows a schematic diagram of a method for wireless communication.

Optionally as shown in FIG. 6B, these HARQ-ACK bits for these six scheduled PDSCHs of two PDSCH groups may transmit on the different PUCCH/PUSCH when two k1 values (K1_1 and K1_2) are provided in the DCI, wherein a first PUCCH 640 is used to transmit the HARQ-ACK bits for the group 0, and a second PUCCH 642 is used to transmit the HARQ-ACK bits for the group 1.

Another embodiment of the various embodiments describes how the UE supports enhanced dynamic HARQ-ACK codebook operation in unlicensed band when multiple PDSCH is scheduled by one DCI, particularly describes how the UE determines the enhanced dynamic HARQ-ACK codebook content and the size. This embodiment may also include to determine which PDSCH HARQ-ACK feedback to be included in the enhanced dynamic HARQ-ACK codebook.

In one implementation of the embodiment, the DCI does not include any specific group-trigger indicator, for example, number of requested PDSCH group(s) information, and the UE may report all the HARQ-ACK feedback for the scheduled multiple PDSCH in one codebook. The method 400 may include that the UE transmits, in a HARQ-ACK codebook transmission slot based on the slot offset, the HARQ-ACK feedback corresponding to all the at least one PDSCH group. The slot offset may be configured according to any of the relevant implementations described above.

In another implementation of the embodiment, the DCI may include a group-trigger indicator, for example, number of For the DCI scheduling multiple PDSCH. The Number of requested PDSCH group(s) information included in the DCI indicates which and how many PDSCH groups it trigger for HARQ-ACK feedback. In one implementation, when the maximum number of PDSCH groups is 2, the bit field of the Number of requested PDSCH group(s) information is 1 bit. When the maximum number of PDSCH groups supported of the enhanced dynamic HARQ-ACK codebook is 4, two bit fields are included in the DCI. When more than two PDSCH group are scheduled by one DCI, the indication or the interpret ion in the DCI may be any one of the following implementations.

In one implementation of the embodiment, a gNB can trigger part of the HARQ-ACK feedback of the scheduled multiple PDSCH. The DCI comprises a group-trigger indicator, the group trigger indicator indicating a trigger group or a number of the triggered PDSCH group for the HARQ-ACK feedback. The UE transmits, in a HARQ-ACK codebook transmission slot based on the slot offset, the HARQ-ACK feedback corresponding to the triggered group indicated by the group-trigger indicator. When two PDSCH groups are defined, the group trigger indicator comprises one bit. The group trigger indicator being a first value indicates a first PDSCH group being the triggered group; and the group trigger indicator being a second value indicates a second PDSCH group being the triggered group. When four PDSCH groups are defined, the group trigger indicator comprises two bits. The group trigger indicator being a first value indicates a first PDSCH group being the triggered group; the group trigger indicator being a second value indicates a second PDSCH group being the triggered group; the group trigger indicator being a third value indicates a third PDSCH group being the triggered group; and the group trigger indicator being a fourth value indicates a fourth PDSCH group being the triggered group.

For example, when the group-trigger indicator (e.g., number of requested PDSCH group(s) information) in the DCI is 0, the group-trigger indicator means the UE only report the HARQ-ACK feedback for the scheduled PDSCH that belong to PDSCH group 0, and the HARQ-ACK feedback for the scheduled PDSCH that belong to PDSCH group 1 is not report in this HARQ-ACK codebook. Similarly, when the value of the Number of requested PDSCH group(s) information in the DCI is 1, the Number of requested PDSCH group(s) information means the UE only report the HARQ-ACK feedback for the scheduled PDSCH that belong to PDSCH group 1, and the HARQ-ACK feedback for the scheduled PDSCH that belong to PDSCH group 0 is not report in this HARQ-ACK codebook.

In another implementation of the embodiment, the DCI comprises a group-trigger indicator, the group-trigger indicator comprising two bits; and the UE transmits, in a HARQ-ACK codebook transmission slot based on the slot offset, the HARQ-ACK feedback corresponding to at least one triggered group indicated by the group-trigger indicator. The group trigger indicator being a first value indicates that the at least one triggered group comprises a first PDSCH group; the group trigger indicator being a second value indicates that the at least one triggered group comprises a second PDSCH group; the group trigger indicator being a third value indicates that the at least one triggered group comprises all the at least one PDSCH group; and the group trigger indicator being a fourth value indicates that the at least one triggered group comprises all the at least one PDSCH group and the HARQ-ACK feedback comprises all HARQ-ACK feedback from a new feedback indication (NFI) toggled time.

For example, the DCI may include two bit fields for the group-trigger indicator, for example, number of requested PDSCH group(s) information. The two bit fields being 00 means only the PDSCH group 0 is triggered. The two bit fields being 01 means only the PDSCH group 1 is triggered for HARQ-ACK codebook feedback. The two bit fields being 10 means the HARQ-ACK of all the scheduled PDSCH of this DCI should be feedback. The two bit fields being 11 means all the HARQ-ACK feedback from the NFI toggled time should be transmitted. When the NFI for this PDSCH group is not toggled, the NFI indicates that the HARQ-ACK codebook contains the HARQ-ACK feedback for the PDSCH scheduled this time and the PDSCH scheduled before that all belong to the same PDSCH group. When the NFI for this PDSCH group is toggled, the NFI indicates that the HARQ-ACK codebook only contain the HARQ-ACK feedback for the PDSCH scheduled this time.

For the NFI bit field design in the DCI scheduled the multiple PDSCH, the embodiment may include at least one of the following methods.

One method includes one NFI bit field in the DCI that scheduled the multiple PDSCH. Optionally in one implementation, the DCI comprises a NFI comprising one bit applying to the first PDSCH group; and the NFI of the other PDSCH group is same as the value of the NFI indicated in the last DCI triggering the same PDSCH group. When the multiple scheduled PDSCH belong to more than one PDSCH groups, the NFI indicated in the DCI applies to the first PDSCH group, and the NFI of the other PDSCH group is the same as the last value indicated in the DCI.

Another method includes that, when the multiple scheduled PDSCHs belong to more than one PDSCH group, each PDSCH group has a NFI in the DCI. For example, when two PDSCH groups are scheduled, 2 bit NFI field may be included in the DCI scheduling the multiple PDSCH. Optionally in one implementation, the DCI comprises a NFI comprising M bit(s) for the at least one PDSCH group, wherein M is the maximum number of the at least one PDSCH group.

Optionally and/or alternatively, for each of the NFI indication, when the NFI is toggled, the UE may discard the HARQ-ACK feedback for the PDSCH(s) in that PDSCH group, and the HARQ-ACK feedback for PDSCH(s) scheduled in this DCI may not be discarded. The HARQ-ACK bit or the counter-DAI (C-DAI) and total-DAI (T-DAI) for this PDSCH group may reset. When the NFI is not toggled, the C-DAI and T-DAI are accumulated within a PDSCH group until the NFI for the PDSCH group is toggled.

In another implementation of the embodiment, the DCI may include a group-trigger indicator, the group trigger indicator comprising one bit for each PDSCH group in the at least one PDSCH group. The method 400 may optionally include that the UE transmits, in a HARQ-ACK codebook transmission slot based on the slot offset, the HARQ-ACK feedback corresponding to at least one triggered group indicated by the group-trigger indicator. Optionally, for a bit of the group trigger indicator for a corresponding PDSCH group: the bit of the group trigger indicator being a first value indicates that the at least one triggered group comprises the corresponding PDSCH group; and the bit of the group trigger indicator being a second value indicates that the at least one triggered group does not comprise the corresponding PDSCH group.

Another embodiment of the various embodiments describes how the UE determines the HARQ-ACK feedback slot for multiple PDSCH scheduling when the scheduled PDSCHs belong to more than one PDSCH group.

In one implementation of the embodiment, when more than one PDSCH groups are scheduled by one DCI, and all these scheduled PDSCH groups are triggered for HARQ-ACK feedback, one K1 value may be provided in the DCI. For example but not limited to, the K1 is the offset slot of the last scheduled PDSCH of the last PDSCH group.

For one implementation, the UE determines a first PDSCH group comprising one or more of the at least one PDSCH; the UE determines a second PDSCH group comprising one or more of the at least one PDSCH; the DCI comprises a group-trigger indicator, the group trigger indicator indicating to trigger the first PDSCH group and the second PDSCH group for the HARQ-ACK feedback; the DCI comprises a slot offset; and the UE transmits, in a HARQ-ACK codebook transmission slot based on the slot offset, the HARQ-ACK feedback corresponding to the first PDSCH group and the second PDSCH group. The method 400 may optionally include that the UE determines the HARQ-ACK codebook transmission slot based on the slot offset after a last scheduled PDSCH in a later-scheduled group between the first PDSCH group and the second PDSCH group.

Figure 7:
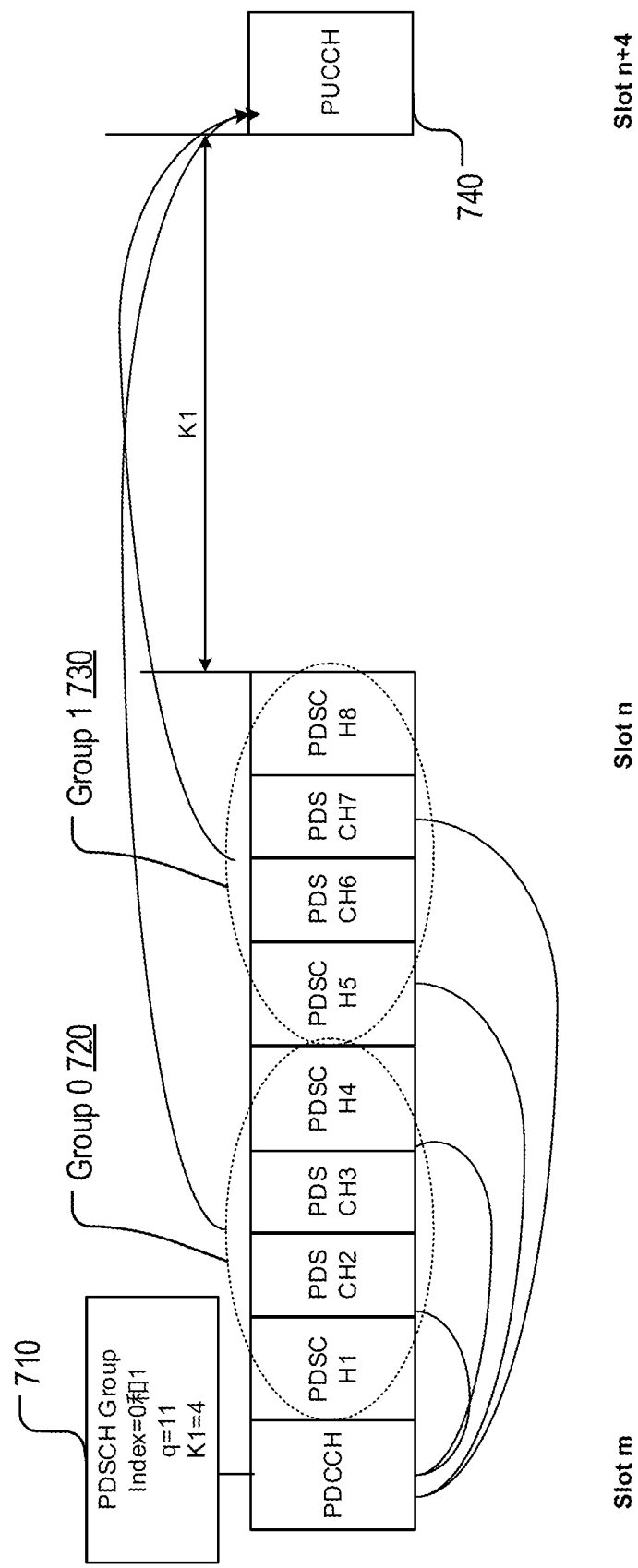
FIG. 7 shows a schematic diagram of a method for wireless communication.

For one example referring to FIG. 7, in slot m, the UE receive one DCI 710 scheduling 8 PDSCHs transmission, wherein PDSCH1, PDSCH2, PDSCH3 and PDSCH4 belong to PDSCH group 0 (720), and PDSCH5, PDSCH6, PDSCH7 and PDSCH8 belong to PDSCH group 1 (730), and the number of requested PDSCH group(s) information indication all the HARQ-ACK feedback of the scheduled PDSCHs should be feedback, and the k1 value is 4. According to the DCI, the UE may feedback the HARQ-ACK codebook containing the 8 bit HARQ-ACK information at the PUCCH 740 for the scheduled 8 PDSCHs after 4 slots of the slot of PDSCH8.

In another implementation of the embodiment, when more than one PDSCH are scheduled by one DCI but only one of the scheduled PDSCH is triggered for HARQ-ACK feedback, one k1 is included in the DCI and the k1 definition is the slot offset of the last PDSCH of the HARQ-ACK feedback triggered PDSCH group.

For one implementation, the UE determines a first PDSCH group comprising one or more of the at least one PDSCH; the UE determines a second PDSCH group comprising one or more of the at least one PDSCH; the DCI comprises a group-trigger indicator, the group trigger indicator indicating to trigger the first PDSCH group for the HARQ-ACK feedback; the DCI comprises a slot offset; and the UE transmits, in a HARQ-ACK codebook transmission slot based on the slot offset, the HARQ-ACK feedback corresponding to the first PDSCH group. The method 400 may optionally include that the UE determines the HARQ-ACK codebook transmission slot based on the slot offset after a last scheduled PDSCH in the first PDSCH group.

Figure 8:
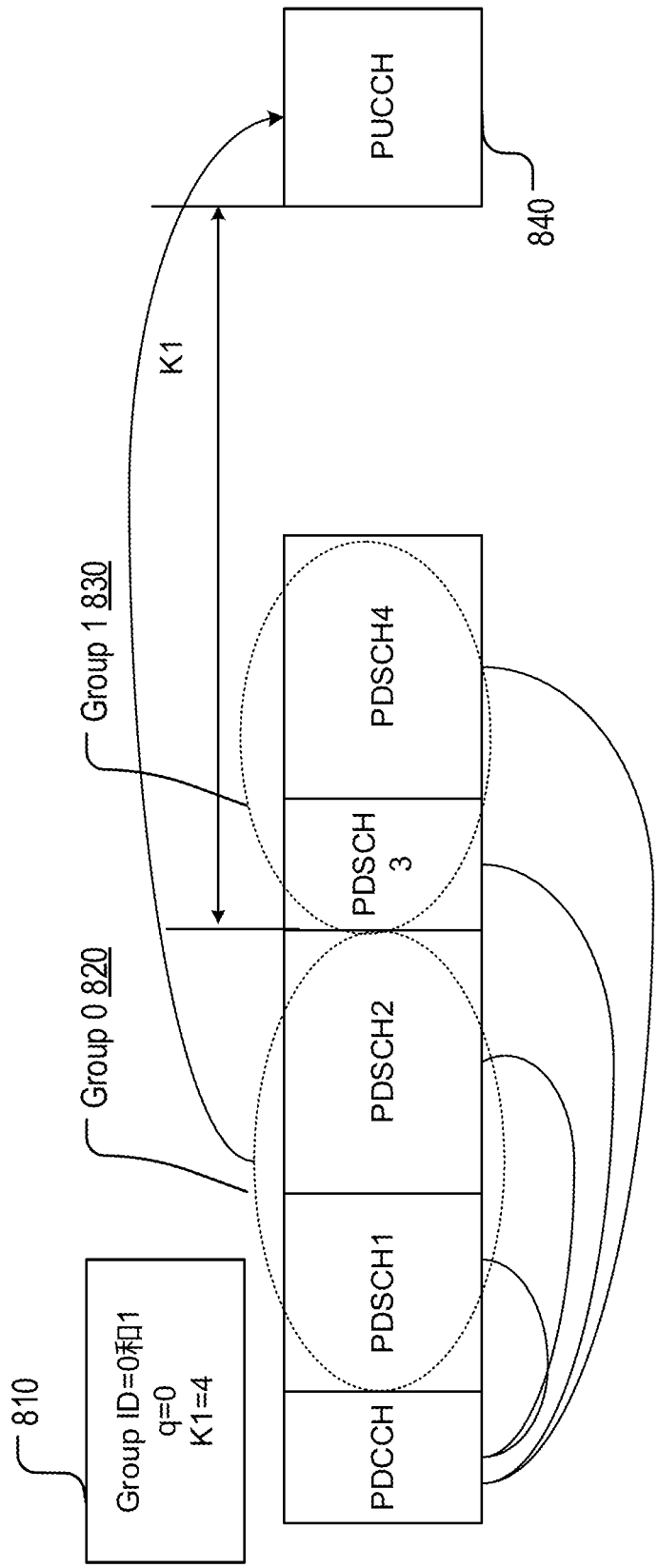
FIG. 8 shows a schematic diagram of a method for wireless communication.

For one example referring to FIG. 8, the DCI 810 includes only one k1 value and indicates that only PDSCH group 0 is triggered for HARQ-ACK feedback. The k1 value 4 is the slot offset of the PUCCH 840 relative to PDSCH 2 that is the last scheduled PDSCH of PDSCH group 0 820, not the last scheduled PDSCH of the PDSCH group 1 830.

In another implementation of the embodiment, when two PDSCH groups are scheduled by one DCI, and two PDSCH groups are triggered for HARQ-ACK feedback, the DCI may include two K1 values. Each K1 is the offset slot of the last scheduled PDSCH of this PDSCH group. The HARQ-ACK codebook of the two PDSCH group may be separately transmitted when two scheduled feedback slots are not the same. When the two scheduled feedback slots are the same, the HARQ-ACK feedback of the two PDSCH group may be transmitted on the same PUCCH. In this case, the UE may not expect to receive the k1 value of the second scheduled PDSCH group for the HARQ-ACK feedback earlier than the first scheduled PDSCH group.

For the implementation, the UE determines a first PDSCH group comprising one or more of the at least one PDSCH; the UE determines a second PDSCH group comprising one or more of the at least one PDSCH; the DCI comprises a group-trigger indicator, the group trigger indicator indicating to trigger the first PDSCH group and the second PDSCH group for the HARQ-ACK feedback; the DCI comprises a first slot offset and a second slot offset. The method 400 may optionally include that the UE transmits, in a first HARQ-ACK codebook transmission slot based on the first slot offset, a first HARQ-ACK feedback corresponding to the first PDSCH group; and the UE transmits, in a second HARQ-ACK codebook transmission slot based on the second slot offset, a second HARQ-ACK feedback corresponding to the second PDSCH group. Optionally in another implementation, the UE may determine the first HARQ-ACK codebook transmission slot based on the first slot offset after a last scheduled PDSCH in the first PDSCH group; and/or the UE may determine the second HARQ-ACK codebook transmission slot based on the second slot offset after a last scheduled PDSCH in the second PDSCH group.

Figure 9:
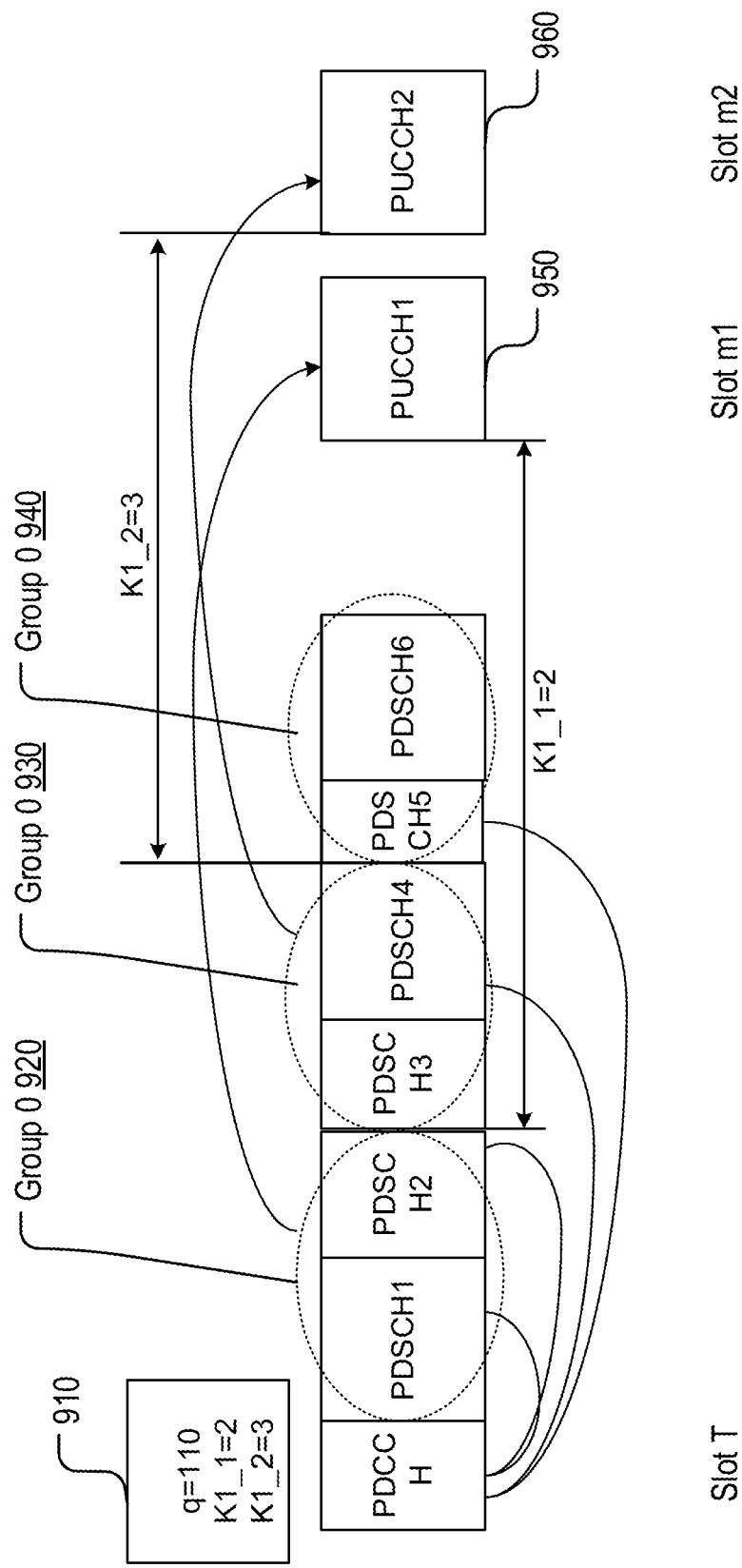
FIG. 9 shows a schematic diagram of a method for wireless communication.

For one example referring to FIG. 9, in slot T, six PDSCHs are scheduled by one DCI 910, and the maximum number of PDSCH group is 4. Each two scheduled PDSCH belong to the same PDSCH group. That is the first two scheduled PDSCHs belong to PDSCH group 0 920 and the second two scheduled PDSCHs belong to PDSCH group 1 930, and the last two scheduled PDSCHs belong to PDSCH group 2 940. q=110 in the DCI, indicating the number of requested PDSCH group(s) is 2, the first two groups (group 0 and group 1). Thus, the PDSCH group 0 and PDSCH group 1 are both triggered for HARQ-ACK feedback.

Besides, in the DCI 910, two k1 values (k1_1=2 and k1_2=3) are provided for these two PDSCH groups, it means k1_1=2 for PDSCH group 0, and k1_2=3 for PDSCH group 1. Optionally, one PRI information may be included in the DCI. After receive these information, the UE will feedback HARQ-ACK information for PDSCH1 and PDSCH2 in PUCCH1 950 in slot m1, and feedback another HARQ-ACK codebook containing HARQ-ACK information for PDSCH3, and PDSCH4 in PUCCH2 960 in slot m2.

Another embodiment of the various embodiments describes how the UE determines the C-DAI/T-DAI information indicated in the DCI for HARQ-ACK feedback for multiple PDSCH scheduling.

In one implementation of the embodiment, the UE receives a radio resource control (RRC) parameter to enable NFI-TotalDAI-Included-r16 included in the DCI; the at least one PDSCH group comprising more than one PDSCH groups that are triggered for the HARQ-ACK feedback; and the DCI comprises a total-downlink assignment index (T-DAI) for each group in the more than one PDSCH groups.

In another implementation of the embodiment, the at least one PDSCH group comprising more than one PDSCH groups that are triggered for the HARQ-ACK feedback; the DCI comprises a T-DAI for a first PDSCH group in the more than one PDSCH groups; and a T-DAI for one or more PDSCH group other than the first PDSCH group in the more than one PDSCH groups is same as a last value of the T-DAI indicated in the DCI scheduling the one or more PDSCH group.

For the above implementation, when two PDSCH groups are scheduled by one DCI, and two PDSCH groups are triggered for HARQ-ACK feedback. The T-DAI of the two PDSCH groups may be both included in the downlink (DL) DCI. That is the RRC parameter NFI-TotalDAI-Included-r16 may be always enabled.

Optionally and alternatively in another implementation, when the slot that indicated in the DCI scheduling PUCCH transmission occasion for HARQ-ACK feedback is just the slot that scheduling PUSCH transmission, the HARQ-ACK transmission may be multiplexed on the PUSCH. The HARQ-ACK bit number may be determined through the DAI information indicated in the UL DCI.

For one example for the above implementation, for the UL DAI indication in the UL DCI, when two PDSCH group are triggered for HARQ-ACK feedback, the DAI included in the DCI is only for one PDSCH group, and the HARQ-ACK feedback for two PDSCH group are needed to transmitted on this DCI scheduled PUSCH and the other DAI for the other PDSCH group is not included in the UL DCI, the indicated DAI may be used for PDSCH group 0, and the DAI for PDSCH group 1 may be obtained from the latest DCI that scheduling PDSCH group 1. Optionally and/or alternatively, when the other DAI for the other PDSCH group is included in the UL DCI and UL-TotalDAI-Included-r16 is configured for enabled, these UL DAI fields may apply separately to each PDSCH group.

Figure 10:
FIG. 10 shows a flow diagram of a method for wireless communication.

The present disclosure describes various embodiments for a method 1000 in FIG. 10 for generating a hybrid automatic repeat request acknowledgement (HARQ-ACK) codebook feedback for at least one physical downlink shared channel (PDSCH) scheduled by a downlink control information (DCI). The method 1000 includes a portion or all of the following steps: step 1010, receiving, by the UE, the DCI comprising a bit field used for triggering a one-shot HARQ-ACK feedback mode; and step 1020, transmitting, by the UE, a one-shot HARQ-ACK feedback based on the set of parameters in the DCI.

The various embodiment may describes how the UE performs one-shot HARQ-ACK feedback when multiple PDSCH are scheduled. In one implementation of the embodiment, the one-shot HARQ-ACK feedback comprises all HARQ-ACK of configured HARQ processes. In another implementation of the embodiment, the one-shot HARQ-ACK feedback comprises all HARQ-ACK of the PDSCH scheduled by the DCI. Optionally and/or alternatively, an order of HARQ-ACK bit in the one-shot HARQ-ACK feedback is according to at least one of the following: a sequence of transmission of the scheduled PDSCH; or an order of a HARQ process number of the scheduled PDSCH. Optionally and/or alternatively, the DCI comprises a slot offset; and the UE transmits the one-shot HARQ-ACK feedback in a HARQ-ACK codebook transmission slot based on the slot offset. Optionally and/or alternatively, the UE determines the HARQ-ACK codebook transmission slot based on at least one of the following: the slot offset after a last scheduled PDSCH in the at least one PDSCH; the slot offset after a first scheduled PDSCH in the at least one PDSCH; the slot offset after a m-th PDSCH in the at least one PDSCH, the m being an integer between 1 and a number of PDSCH in the at least one PDSCH, inclusive; or the slot offset after the DCI.

For one example in one of the implementations discussed above, when the DCI schedules multiple PDSCHs, one bit field for one-shot request may be contained in this DCI. When the value of the one bit field for one-shot request is 1, the one bit field for one-shot request indicates that the UE may do one-shot HARQ-ACK feedback. The one-shot HARQ-ACK feedback may contain all the HARQ-ACK of the configured HARQ process, or the one-shot HARQ-ACK feedback may only contain the HARQ-ACK of scheduled PDSCH of this DCI. When the one-shot HARQ-ACK feedback only contains the HARQ-ACK of scheduled PDSCH of this DCI, the order of the HARQ-ACK bit can be according to the sequence of the transmission of the PDSCH or according to the order of the HARQ process number. Optionally and/or alternatively, the k1 indicated in this trigger one-shot HARQ-ACK feedback DCI may be at least one of the following: an offset slot of the last scheduled PDSCH, an offset slot of the first scheduled PDSCH of the multiple PDSCH(s), an offset slot of the scheduled PDSCH between the first and last of the multiple PDSCH(s), or an offset slot of the DCI scheduling the multiple PDSCH.

Figure 11:
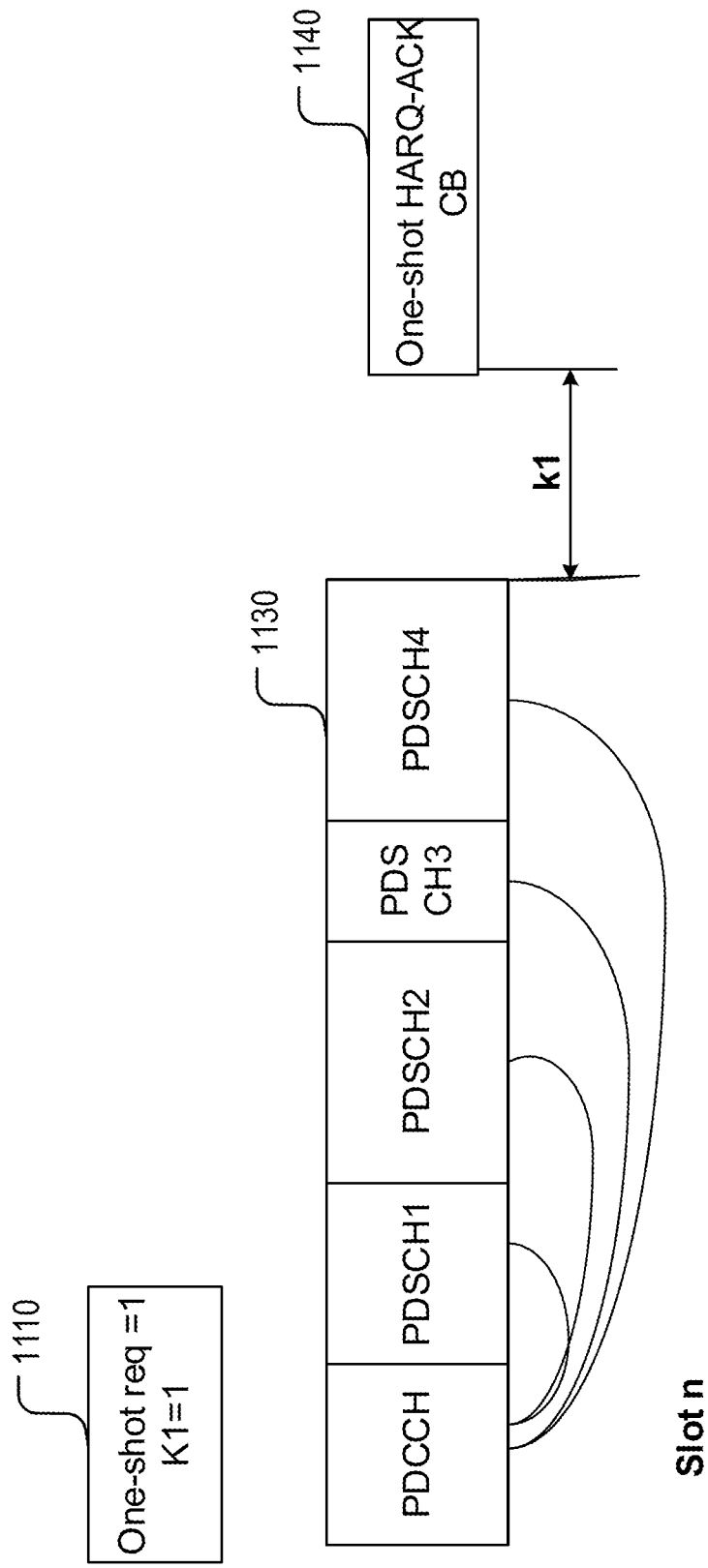
FIG. 11 shows a schematic diagram of a method for wireless communication.

For another example referring in FIG. 11, in slot n, the UE receive a DCI 1110, the value of the one-shot request bit field in the DCI is 1, and the k1 in the DCI is equal to 1. The UE may configure to feedback the one-shot HARQ-ACK codebook 1140 in the next slot, because of k1=1, of the last scheduled PDSCH slot (PDSCH 4 1130). When the UE has not get the HARQ-ACK information of the scheduled PDSCH, the UE may feedback NACK for this PDSCH.

The present disclosure describes methods, apparatus, and computer-readable medium for wireless communication. The present disclosure addressed the issues with generating a hybrid automatic repeat request acknowledgement (HARQ-ACK) codebook feedback for at least one physical downlink shared channel (PDSCH) scheduled by a downlink control information (DCI). The methods, devices, and computer-readable medium described in the present disclosure may facilitate the performance of wireless communication by generating HARQ-ACK feedback for PDSCH transmission, thus improving efficiency and overall performance.

The methods, devices, and computer-readable medium described in the present disclosure may improves the overall efficiency of the wireless communication systems.

Reference throughout this specification to features, advantages, or similar language does not imply that all of the features and advantages that may be realized with the present solution should be or are included in any single implementation thereof. Rather, language referring to the features and advantages is understood to mean that a specific feature, advantage, or characteristic described in connection with an embodiment is included in at least one embodiment of the present solution. Thus, discussions of the features and advantages, and similar language, throughout the specification may, but do not necessarily, refer to the same embodiment.

Furthermore, the described features, advantages and characteristics of the present solution may be combined in any suitable manner in one or more embodiments. One of ordinary skill in the relevant art will recognize, in light of the description herein, that the present solution can be practiced without one or more of the specific features or advantages of a particular embodiment. In other instances, additional features and advantages may be recognized in certain embodiments that may not be present in all embodiments of the present solution.

The invention claimed is:

1. A method for wireless communication, comprising:
generating a hybrid automatic repeat request acknowledgement (HARQ-ACK) codebook feedback for at least one physical downlink shared channel (PDSCH) scheduled by a downlink control information (DCI) by:
receiving, by a user equipment (UE), a radio resource control (RRC) parameter to configure an enhanced dynamic HARQ-ACK codebook feedback mode;
receiving, by the UE, the DCI comprising a set of parameters to configure at least one PDSCH group comprising the at least one PDSCH; and
transmitting, by the UE, a HARQ-ACK codebook feedback based on the set of parameters in the DCI and the at least one PDSCH group,
wherein:
the at least one PDSCH group comprises more than one PDSCHs that are triggered for the HARQ-ACK feedback,
the DCI comprises a total-downlink assignment index (T-DAI) only for a first PDSCH group in more than one PDSCH groups, and does not comprise a T-DAI for one or more PDSCH group other than the first PDSCH group in the more than one PDSCH groups,
a T-DAI for the one or more PDSCH group other than the first PDSCH group in the more than one PDSCH groups is same as a last T-DAI value indicated in a latest DCI scheduling the one or more PDSCH group other than the first PDSCH group,
the DCI comprises a group-trigger indicator, the group-trigger indicator comprising two bits,
the group-trigger indicator being a first value indicates that the at least one triggered group comprises the first PDSCH group,
the group-trigger indicator being a second value indicates that the at least one triggered group comprises a second PDSCH group,
the group-trigger indicator being a third value indicates that the at least one triggered group comprises all the at least one PDSCH group, and
the group-trigger indicator being a fourth value indicates that the at least one triggered group comprises all the at least one PDSCH group and the HARQ-ACK feedback comprises all HARQ-ACK feedback from a new feedback indication (NFI) toggled time.

2. The method according to claim 1, wherein:
the UE configures the first PDSCH group comprising the at least one PDSCH;
the DCI comprises a slot offset; and
the UE transmits the HARQ-ACK feedback corresponding to the first PDSCH group in a HARQ-ACK codebook transmission slot based on the slot offset.

3. The method according to claim 2, wherein:
the UE determines the HARQ-ACK codebook transmission slot based on the slot offset after a last scheduled PDSCH in the first PDSCH group.

4. The method according to claim 2, wherein:
the UE determines the HARQ-ACK codebook transmission slot based on the slot offset after a first scheduled PDSCH in the first PDSCH group.

5. The method according to claim 2, wherein:
the UE determines the HARQ-ACK codebook transmission slot based on the slot offset after a m-th PDSCH in the first PDSCH group, the m being an integer between 1 and a number of PDSCH in the first PDSCH group, inclusive.

6. The method according to claim 1, wherein:
the DCI comprises a group index for each scheduled PDSCH in the at least one PDSCH; and
the UE determines the at least one PDSCH into at least one PDSCH group based on the group index for each scheduled PDSCH.

7. The method according to claim 6, wherein:
in response to at least two PDSCH groups being defined:
the group index being a first value indicates the first PDSCH group; and
the group index being a i value indicates a k-th PDSCH group, wherein i equals to or smaller than a number of the at least one PDSCH, and k equals to or smaller than a maximum number of the at least one PDSCH group.

8. The method according to claim 1, wherein:
the DCI comprises a group index for a first scheduled PDSCH in the at least one PDSCH; and
the UE determines the at least one PDSCH into a corresponding PDSCH group based on the group index for the first scheduled PDSCH.

9. The method according to claim 1, wherein:
the UE transmits, in a HARQ-ACK codebook transmission slot based on the slot offset, the HARQ-ACK feedback corresponding to all the at least one PDSCH group.

10. The method according to claim 1, wherein:
the DCI comprises a group-trigger indicator, the group-trigger indicator indicating a trigger group or a number of the triggered PDSCH group for the HARQ-ACK feedback; and
the UE transmits, in a HARQ-ACK codebook transmission slot based on the slot offset, the HARQ-ACK feedback corresponding to the triggered group indicated by the group-trigger indicator.

11. The method according to claim 1, wherein:
the UE transmits, in a HARQ-ACK codebook transmission slot based on the slot offset, the HARQ-ACK feedback corresponding to at least one triggered group indicated by the group-trigger indicator.

12. The method according to claim 11, wherein:
the DCI comprises a NFI comprising one bit applying to the first PDSCH group; and the NFI of the other PDSCH group is same as the value of the NFI indicated in the last DCI triggering the same PDSCH group.

13. The method according to claim 1, wherein:
the UE receives a radio resource control (RRC) parameter to enable NFI-TotalDAI-Included-r16 included in the DCI; and
the DCI comprises a total-downlink assignment index (T-DAI) for each group in the more than one PDSCH groups.

14. An apparatus comprising:
a memory storing instructions; and
a processor in communication with the memory, wherein, when the processor executes the instructions, the processor is configured to cause the apparatus to perform:
  generating a hybrid automatic repeat request acknowledgement (HARQ-ACK) codebook feedback for at least one physical downlink shared channel (PDSCH) scheduled by a downlink control information (DCI) by:
    receiving a radio resource control (RRC) parameter to configure an enhanced dynamic HARQ-ACK codebook feedback mode;
    receiving the DCI comprising a set of parameters to configure at least one PDSCH group comprising the at least one PDSCH; and
    transmitting a HARQ-ACK codebook feedback based on the set of parameters in the DCI and the at least one PDSCH group,
wherein:
  the at least one PDSCH group comprises more than one PDSCHs that are triggered for the HARQ-ACK feedback,
  the DCI comprises a total-downlink assignment index (T-DAI) for a first PDSCH group in more than one PDSCH groups, and does not comprise a T-DAI for one or more PDSCH group other than the first PDSCH group in the more than one PDSCH groups,
  a T-DAI for the one or more PDSCH group other than the first PDSCH group in the more than one PDSCH groups is same as a last T-DAI value indicated in a latest DCI scheduling the one or more PDSCH group other than the first PDSCH group,
  the DCI comprises a group-trigger indicator, the group-trigger indicator comprising two bits,
  the group-trigger indicator being a first value indicates that the at least one triggered group comprises the first PDSCH group,
  the group-trigger indicator being a second value indicates that the at least one triggered group comprises a second PDSCH group,
  the group-trigger indicator being a third value indicates that the at least one triggered group comprises all the at least one PDSCH group, and
  the group-trigger indicator being a fourth value indicates that the at least one triggered group comprises all the at least one PDSCH group and the HARQ-ACK feedback comprises all HARQ-ACK feedback from a new feedback indication (NFI) toggled time.

15. A non-transitory computer-readable medium storing instructions, wherein, the instructions, when executed by a processor, are configured to cause the processor to perform:
  generating a hybrid automatic repeat request acknowledgement (HARQ-ACK) codebook feedback for at least one physical downlink shared channel (PDSCH) scheduled by a downlink control information (DCI) by:
    receiving a radio resource control (RRC) parameter to configure an enhanced dynamic HARQ-ACK codebook feedback mode;
    receiving the DCI comprising a set of parameters to configure at least one PDSCH group comprising the at least one PDSCH; and
    transmitting a HARQ-ACK codebook feedback based on the set of parameters in the DCI and the at least one PDSCH group,
wherein:
  the at least one PDSCH group comprises more than one PDSCHs that are triggered for the HARQ-ACK feedback,
  the DCI comprises a total-downlink assignment index (T-DAI) for a first PDSCH group in more than one PDSCH groups, and does not comprise a T-DAI for one or more PDSCH group other than the first PDSCH group in the more than one PDSCH groups,
  a T-DAI for the one or more PDSCH group other than the first PDSCH group in the more than one PDSCH groups is same as a last T-DAI value indicated in a latest DCI scheduling the one or more PDSCH group other than the first PDSCH group,
  the DCI comprises a group-trigger indicator, the group-trigger indicator comprising two bits,
  the group-trigger indicator being a first value indicates that the at least one triggered group comprises the first PDSCH group,
  the group-trigger indicator being a second value indicates that the at least one triggered group comprises a second PDSCH group,
  the group-trigger indicator being a third value indicates that the at least one triggered group comprises all the at least one PDSCH group, and
  the group-trigger indicator being a fourth value indicates that the at least one triggered group comprises all the at least one PDSCH group and the HARQ-ACK feedback comprises all HARQ-ACK feedback from a new feedback indication (NFI) toggled time.

* * * * *